Dec. 15, 1936.  F. K. DAVIS  2,064,340
COMBINED TYPEWRITING, BOOKKEEPING, AND CARD PERFORATING MACHINE
Original Filed July 8, 1927  10 Sheets—Sheet 1
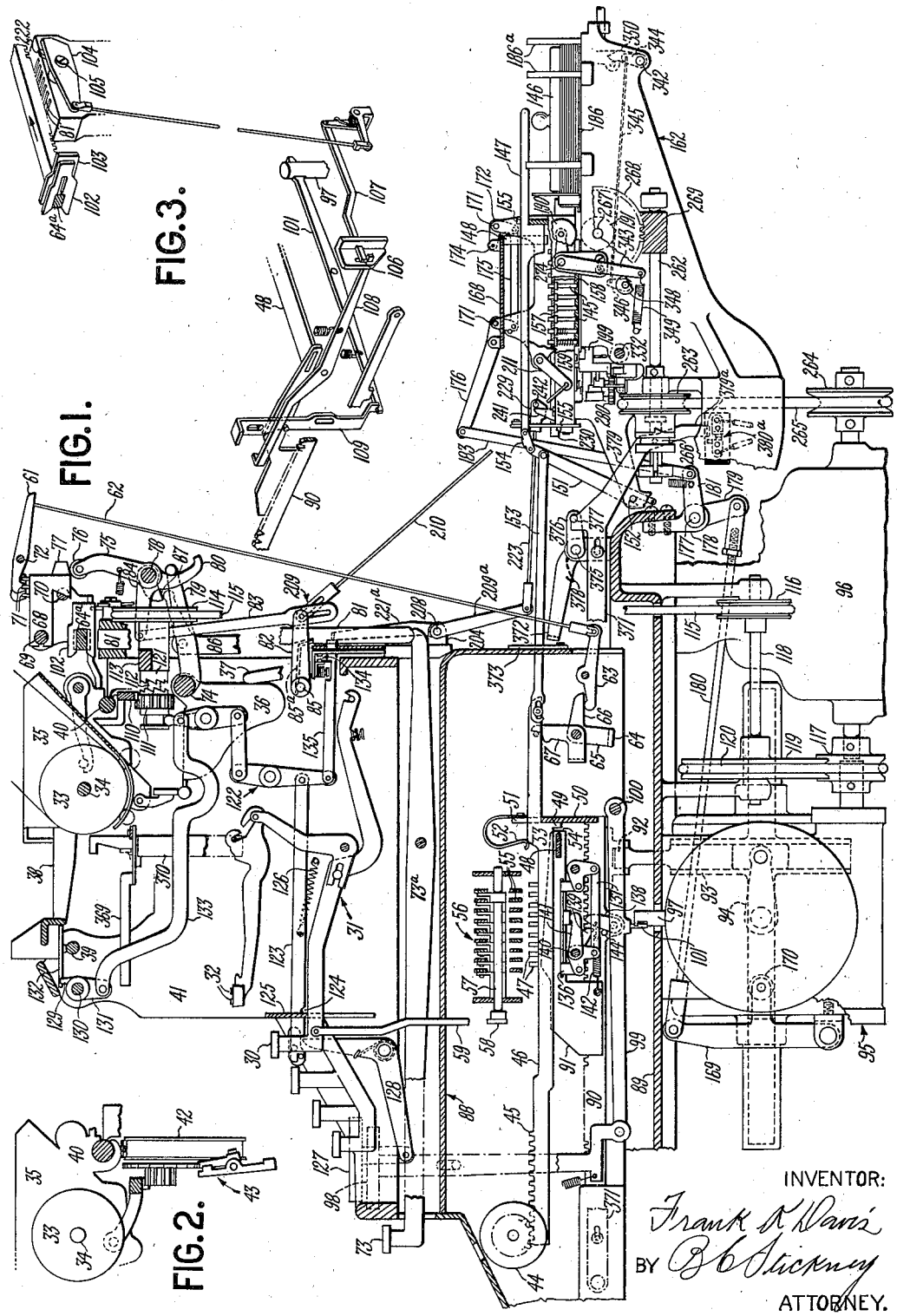
INVENTOR:
Frank K Davis
BY C C Stickney
ATTORNEY.

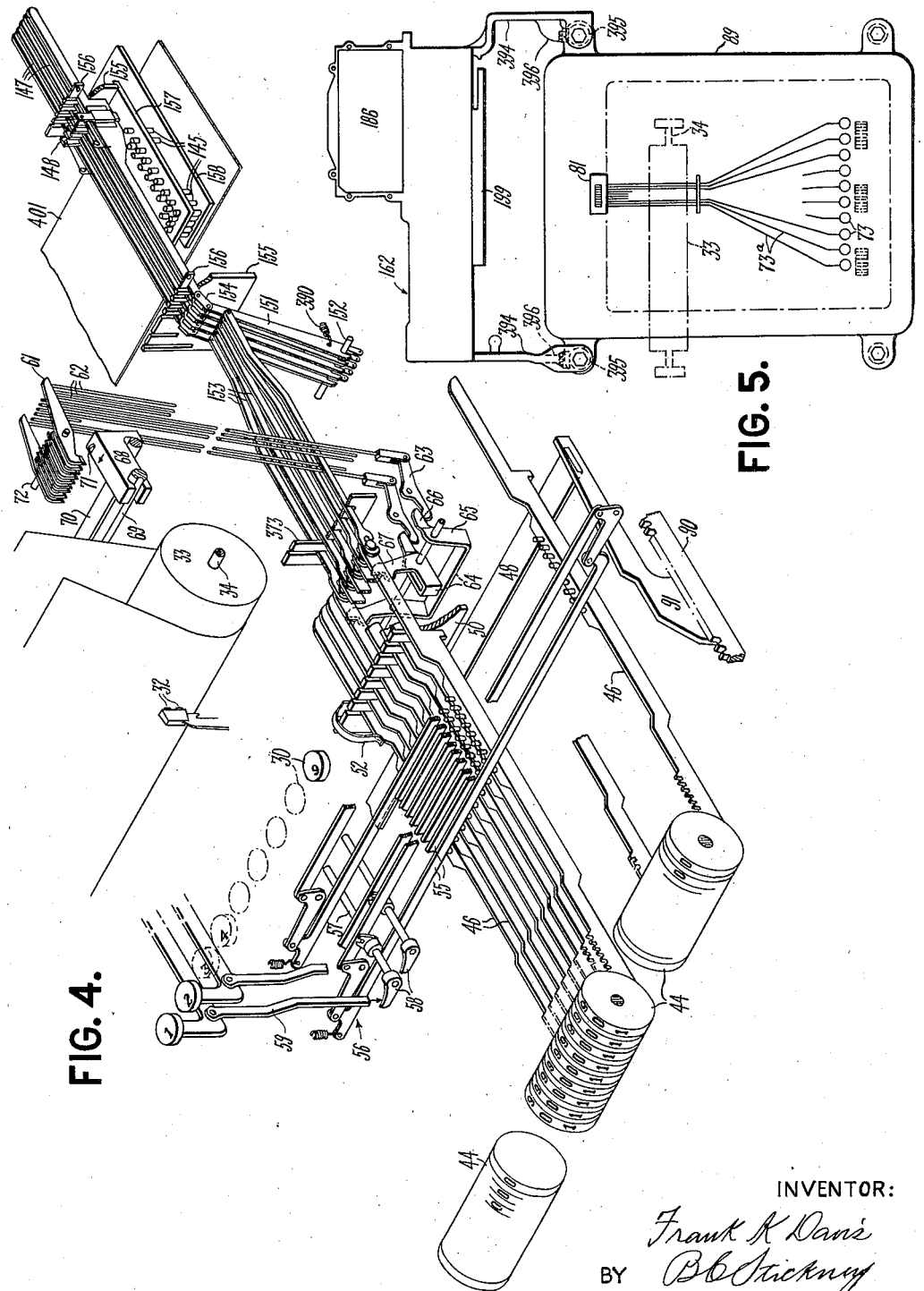

Dec. 15, 1936.  F. K. DAVIS  2,064,340
COMBINED TYPEWRITING, BOOKKEEPING, AND CARD PERFORATING MACHINE
Original Filed July 8, 1927   10 Sheets-Sheet 3
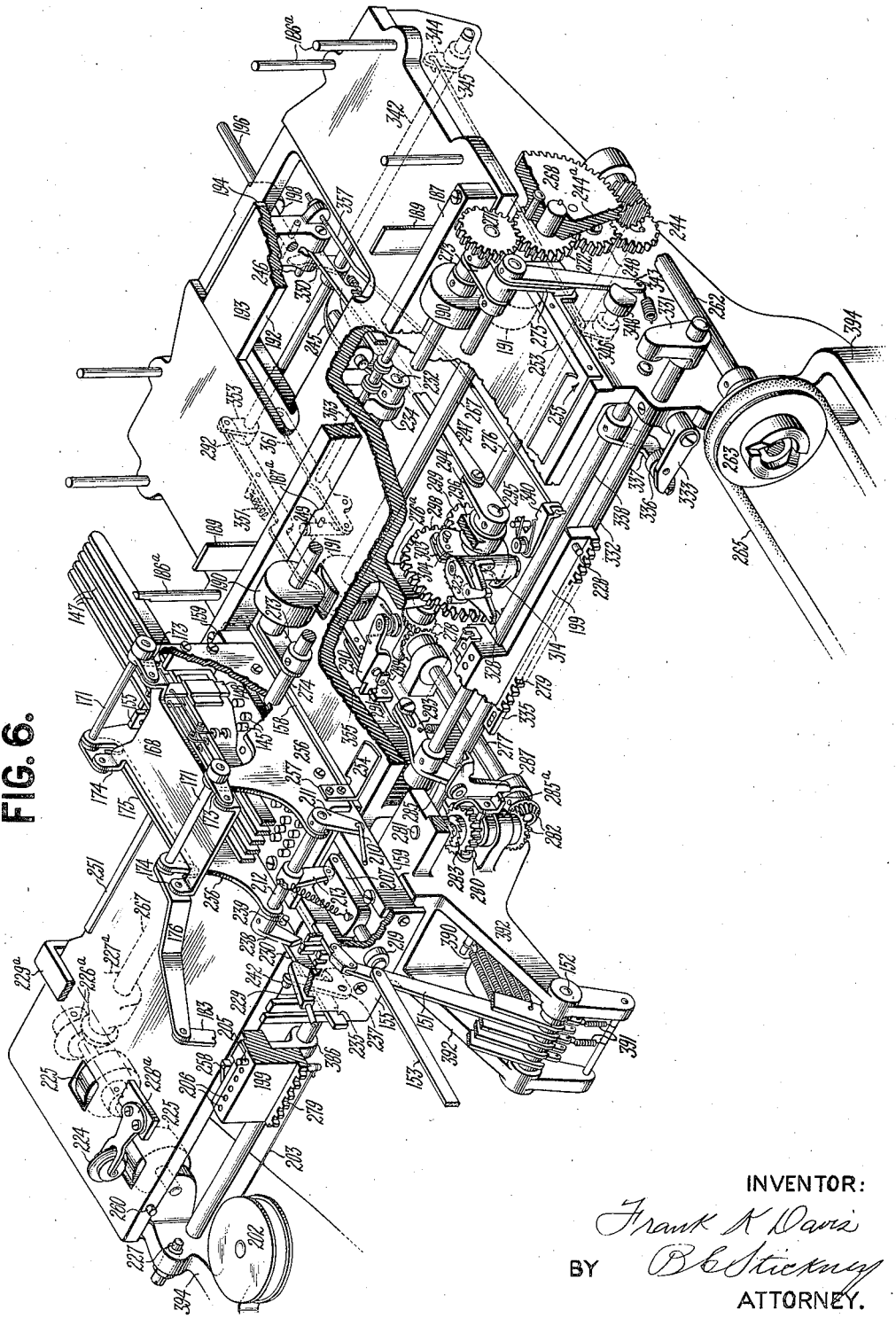
INVENTOR:
Frank K Davis
BY B. E. Stickney
ATTORNEY.

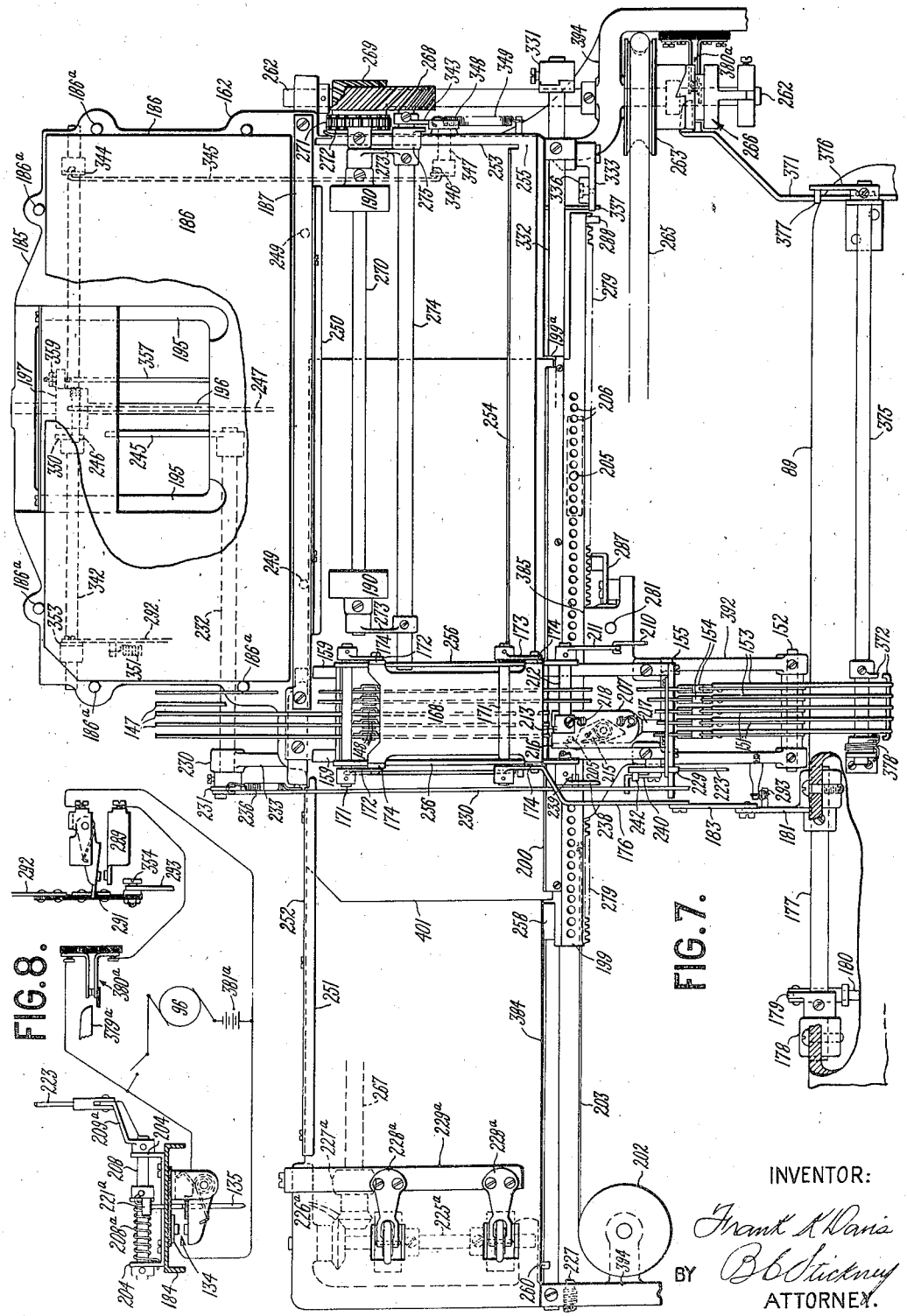

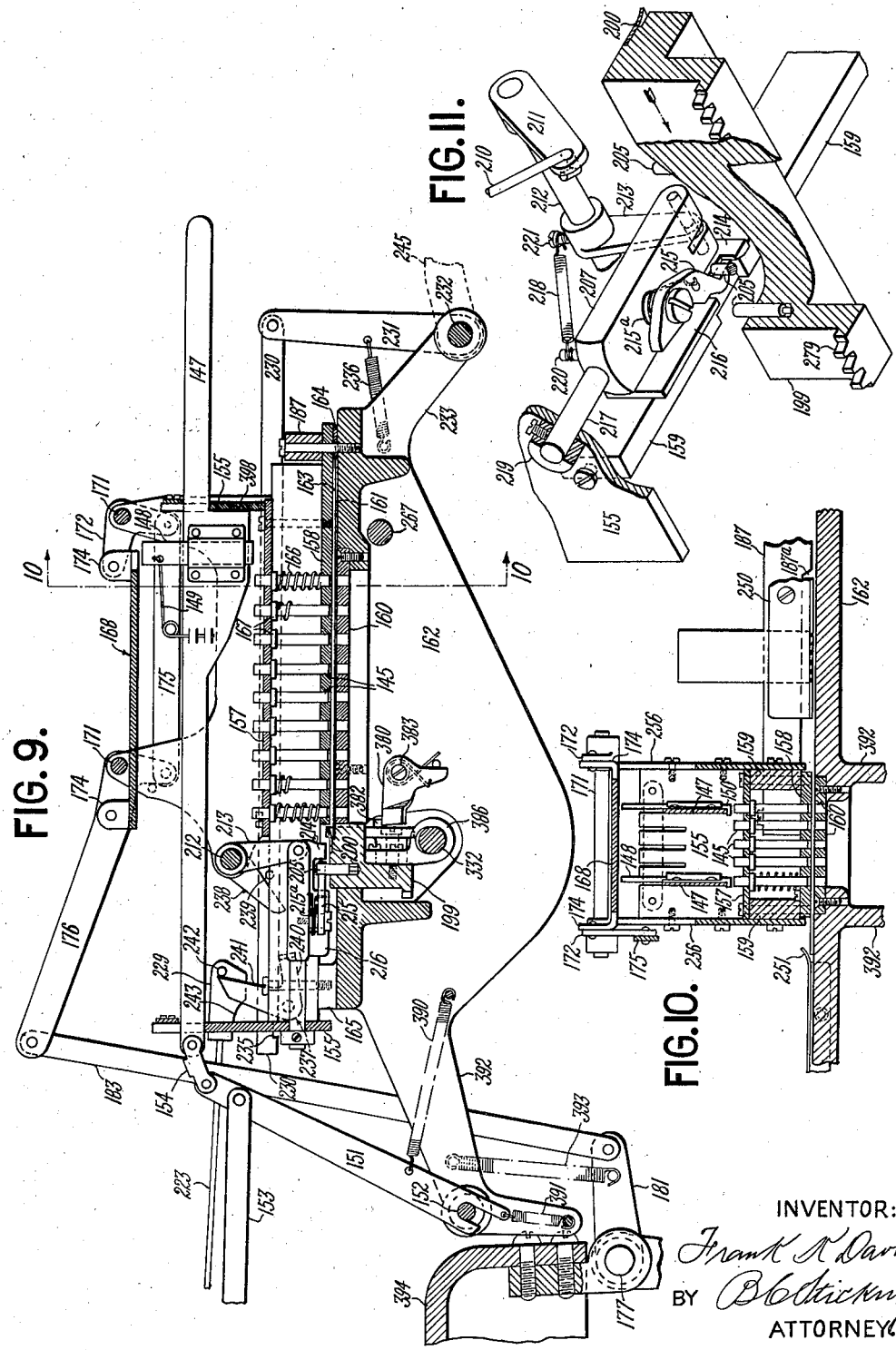

Dec. 15, 1936.　　　　F. K. DAVIS　　　　2,064,340
COMBINED TYPEWRITING, BOOKKEEPING, AND CARD PERFORATING MACHINE
Original Filed July 8, 1927　　10 Sheets-Sheet 6

INVENTOR:
Frank K Davis
BY B C Stickney
ATTORNEY.

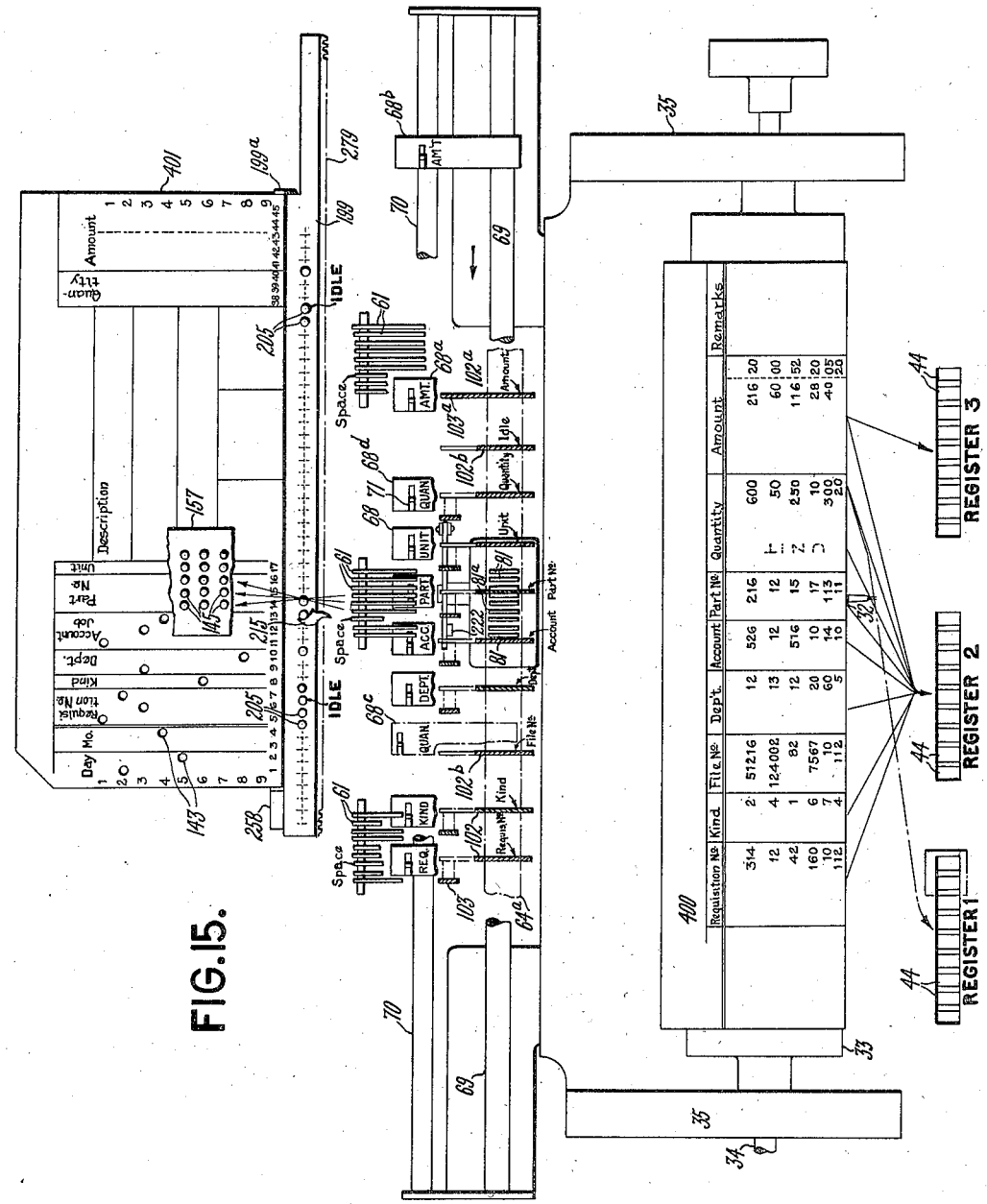

Dec. 15, 1936.  F. K. DAVIS  2,064,340
COMBINED TYPEWRITING, BOOKKEEPING, AND CARD PERFORATING MACHINE
Original Filed July 8, 1927  10 Sheets—Sheet 8
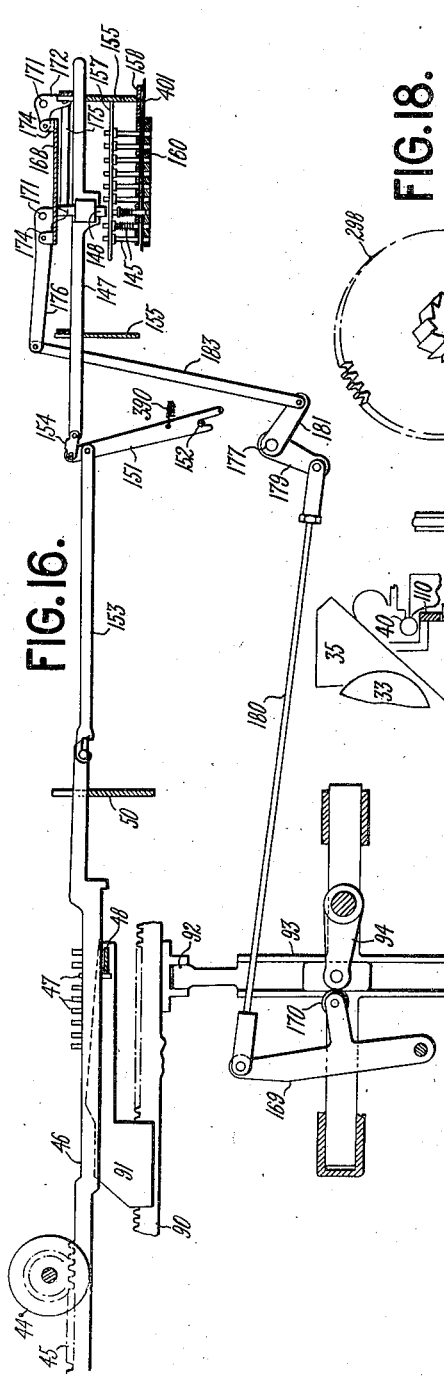
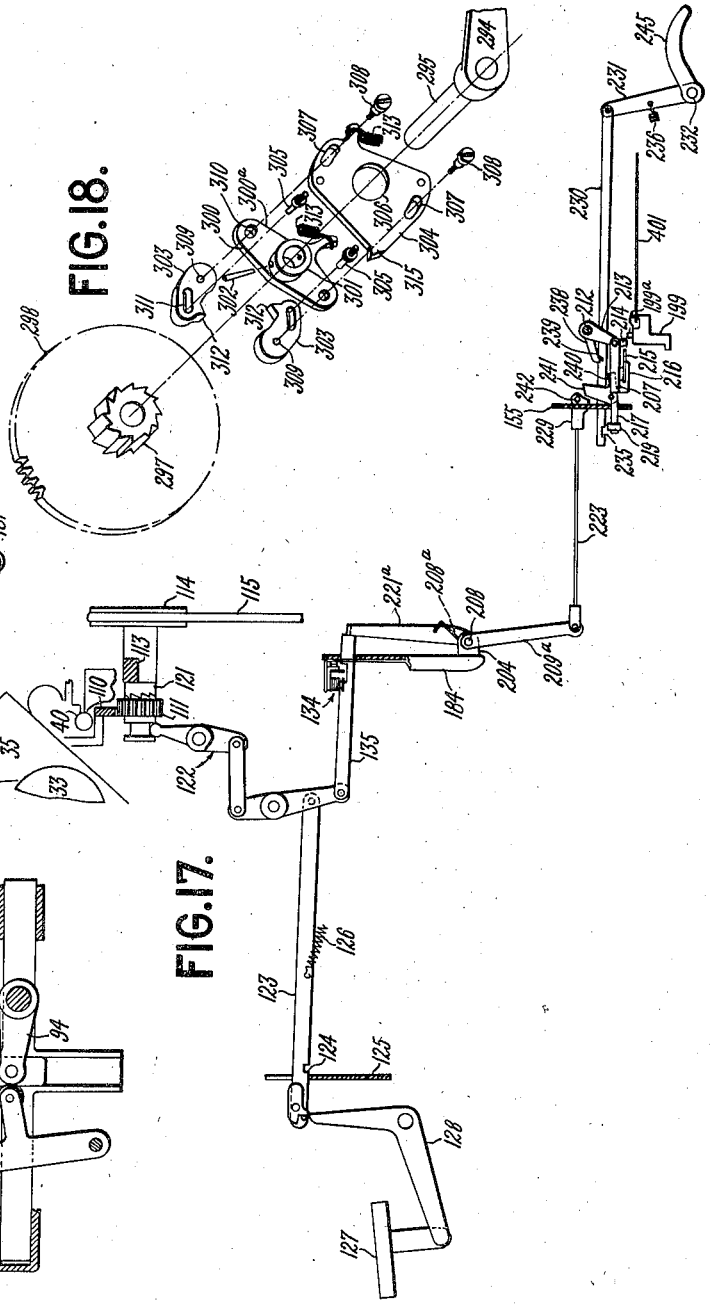
INVENTOR:
Frank K Davis
BY
ATTORNEY.

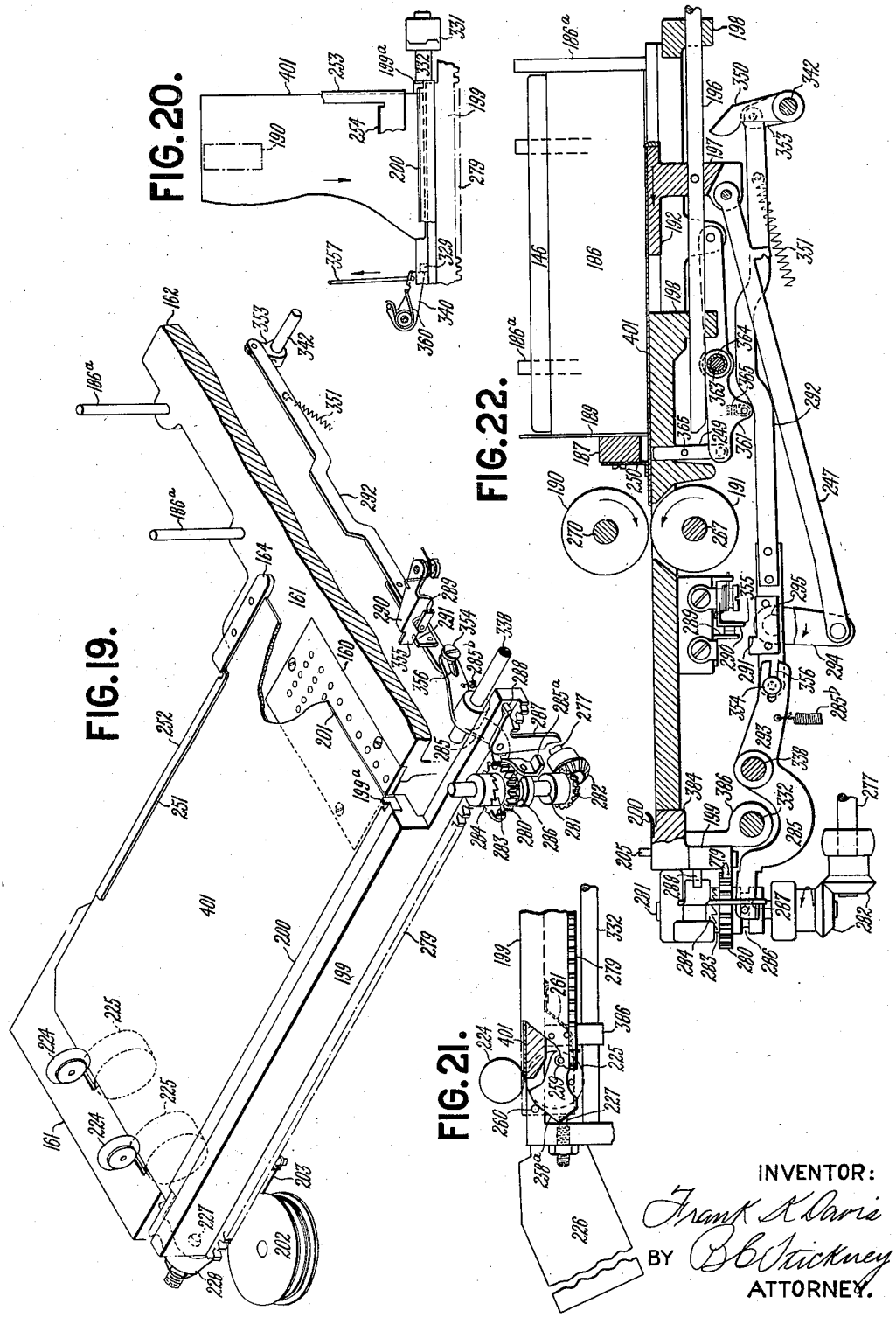

Dec. 15, 1936.                F. K. DAVIS                2,064,340
COMBINED TYPEWRITING, BOOKKEEPING, AND CARD PERFORATING MACHINE
Original Filed July 8, 1927      10 Sheets-Sheet 10
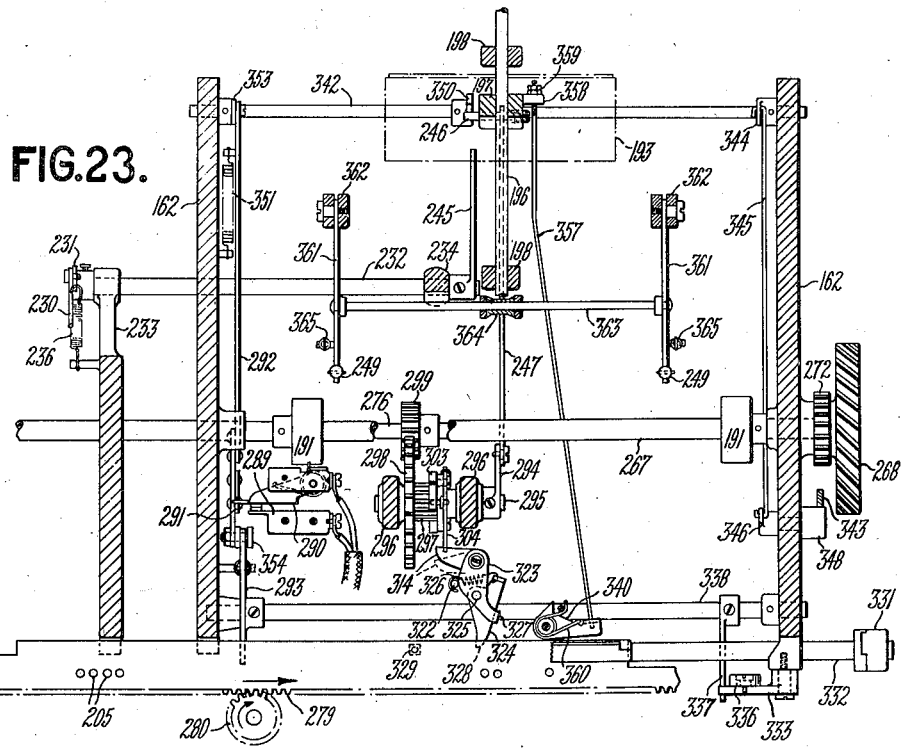
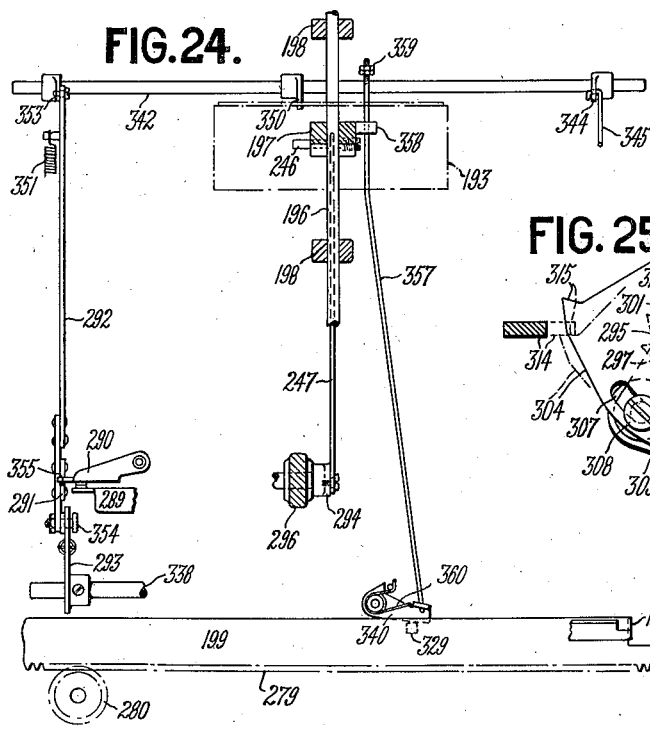
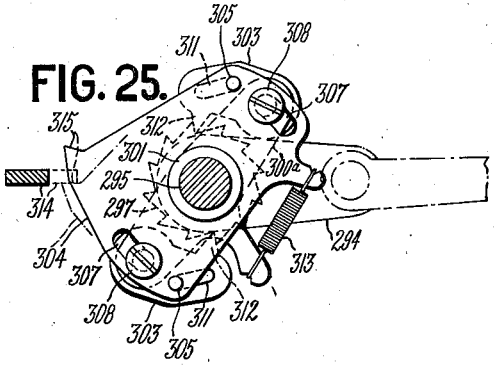
INVENTOR:
Frank K Davis
BY DC Stickney
ATTORNEY.

Patented Dec. 15, 1936

2,064,340

UNITED STATES PATENT OFFICE 2,064,340

COMBINED TYPEWRITING, BOOKKEEPING, AND CARD-PERFORATING MACHINE

Frank K. Davis, Silver Spring, Md., assignor, by mesne assignments, to Underwood Elliott Fisher Company, New York, N. Y., a corporation of Delaware Original application July 8, 1927, Serial No. 204,249. Patent 1,864,714, dated June 28, 1932. Divided and this application December 7, 1929, Serial No. 414,298

71 Claims. (Cl. 164—112)

This invention relates to a combined typewriting, computing and card-perforating machine, and, generally stated, provides a novel organization wherein a novel card-perforating mechanism is automatically controlled through the medium of computing mechanism, to the end that, while items are being accumulated in said computing mechanism, the card-perforating mechanism is automatically caused to be actuated to record some or all of said items in recordcards, said items being thus recorded by means of perforations in said cards. This divisional case relates to the perforating feature and the mechanism for effecting and controlling same.

The preferred form of the new organization includes the well-known Underwood-Hanson combined typewriting and computing machine in which the operation of typewriter-keys may set up items in computing mechanism, which is below the typewriter and which computing mechanism is then operated to accumulate said items in one or more registers. As is usual in most computing mechanisms, the several digit-numerals of the items are set up in respect to a denominational series of register-bars or the like, each of which may have, when the item is being accumulated, an individual movement, the extent of which depends on the digit set up in respect thereto. In the Underwood-Hanson machine, each register-bar has, extending lengthwise thereof in the direction of its movement, a row of settable digit-pins, by means of which the extent of movement of said bar is determined. Thus it may be said that the digits are set up in said register-bars.

The novel card-perforating mechanism includes a nest of digit-punches arrayed in numerous denominational columns, the arrangement of which corresponds to similar columns of digit-spaces of the card to be punched. A punch-selecting plunger, pin, or equivalent device is provided for each denominational column of punches and is individually movable along said column of punches to the particular digit-punch which is to be selected and rendered effective thereby.

An important feature of the invention resides in the provision of means whereby each punchselecting device is keyed to one of the aforesaid register-bars so that the movement of said bar to accumulate the digit indexed therein automatically serves to move the punch-selecting device to the corresponding digit-punch. The novel card-perforating mechanism which has been evolved by virtue of the application of said feature is, as will hereinafter become evident, compact, may be manufactured at low cost, and is mechanically and consequently positively controlled and operated, as distinguished from the electrically-controlled devices of similar character heretofore used.

The Underwood-Hanson typewriting and computing machine is generally used to list groups of related items or data upon predetermined forms of work-sheets, and to accumulate at the same time some or all of the items in registers. In the usual course of the work the amounts accumulated, as indicated in the dial-wheels of the registers, are transcribed either to the aforesaid work-sheet or to other sheets. In combination with the present invention, the UnderwoodHanson computing machine or similar computing mechanism may also serve to produce perforated record-cards descriptive of said items or data, said cards being thus produced coincidentally with the listing of said items or data upon the aforesaid work-sheet and with practically no extra expenditure of labor on the part of the operator.

The card to be perforated is usually divided into zones, defining the nature of the several items to be recorded therein. Some of the items, as, for example, the different code-numbers used to designate various commodities, departments or similar classifications need, of course, not to be accumulated in registers, and are to this extent different from items such as amounts which are to be accumulated.

The Underwood-Hanson computing machine has the usual register-bar pin-setting or indexing mechanism controlled by the numeral typekeys, and, by means of said indexing mechanism, it is feasible to set up an item in several sets of register-bars or in any predetermined one or more of said sets of bars, each set of registerbars being usually associated with a corresponding register or accumulator as exemplified in Patent 1,190,171 to F. A. Hart, dated July 4, 1916. Thus, one set of register-bars may have all or some of its bars keyed to the aforesaid punchselecting devices, and, if, as may occur when using the preferred form of the invention, the several items which are successively set up in said one set of bars are of different orders, the total accumulated in a register associated with said one set of bars will be a nondescript amount and may be disregarded. A register is, however, preferably to be provided with said one set of bars, as there may be forms of work in which all the items to be recorded on a card are of the same order and are to be accumulated. It is optional whether or not the set of register-bars which are keyed to the punch-operating devices are provided with an accumulator, namely, a set of computing wheels, and it will be understood that other registers operated by other sets of register-bars, as is feasible with the Underwood-Hanson indexing mechanism, and exemplified at Figure 15 of this application may serve to accumulate various orders of amounts, while said amounts are caused to be transferred to the record-card through the medium of the aforesaid one set of register-bars.

The number of the aforesaid columns of digit-punches of course does not exceed the number of register-bars of the set of bars which serves to select said punches, and perforation of the card is therefore preferably effected in one zone at a time. The number of columns of punches may be less than the number of register-bars of the set to which said columns are keyed. All the register-bars that have digits set up therein have a reciprocatory movement to effect the accumulation of said digits, and are driven in said movement by means of the usual general operator, which may be either hand-operated or driven by means of the usual motor, connection between the motor and the general operator being established by means controlled, either automatically through the movements of the typewriter-carriage, or by the usual manually-operable key.

Since only one zone of a card at a time is punched, means are provided in the card-perforator mechanism for automatically moving the several zones of the card into punching relation with the nest of punches. The work-sheet in the typewriter is also divided into zones which define the nature of the items or data written therein, and it is customary to operate the usual tabulating mechanism to move the typewriter-carriage, so that the several zones of the work-sheet are successively brought into printing position. The means provided in the card-perforator mechanism whereby the several zones of the card are brought into punching position include a card-carriage. For controlling the movements of the card-carriage, an escapement-mechanism is preferably provided and has stops which are settable. By means of said escapement-mechanism and its settable stops, the card-carriage, which may be propelled by means of a spring-motor, may bring the zones of the card therein into different predetermined punching positions.

Generally stated, the card-perforator escapement-mechanism is automatically caused to be actuated every time a new zone of the work-sheet on the typewriter is brought into printing position by tabulating the typewriter-carriage, so that a corresponding zone of the card is brought into punching position.

The card-carriage escapement-mechanism may be so arranged that its operation may be controlled in various respects, as, for example, when it is desired that a card-zone be not skipped while tabulating the typewriter-carriage to write in a zone for which there is no corresponding zone on the card.

The cards may be automatically fed by power-driven means from a supply-stack into the perforator-card carriage, which is designed to receive one card at a time. At the time of receiving a card the card-carriage is in an initial position, from which it is moved step by step to bring the various zones of the card into punching position under the punches. Means are also provided so that the card may be caused to be ejected from said carriage after the punching of the card therein is completed to the extent desired. Power-driven means may also be provided for automatically returning the card-carriage to its initial starting position where it may receive a new card.

A die-plate co-operates with the nest of punches, and there is normally a gap between the punching surface of said die-plate and the ends of the punches. It is within said gap that the card is moved endwise to bring its different zones into punching position. Power-driven punch-operating means may be provided for causing the selected punches to penetrate the card, and the punches may be either stripped from the card positively or by suitable springs, one of which may be applied to each punch, the latter way of stripping the punches from the card being the preferred way herein shown.

The main features of the power-driven means for feeding the cards, one at a time, into the card-carriage, for operating the punches, and for returning the card-carriage to its initial position, are incorporated in the novel card-perforator mechanism and may be driven by means of the same motor and power transmission mechanism that actuates the Underwood-Hanson computing mechanism. Thus there is avoided the need of providing a separate motor-drive for the perforating mechanism.

Said transmission mechanism of the Underwood-Hanson computing machine includes a reciprocatory member for driving the aforesaid general operator, and, as said reciprocatory member has a harmonic motion, its movement may be used for causing the punches to punch the card, the actual penetration of the card by the punches being so timed that it occurs and is effected by means of the aforesaid power-driven punch-operating means at the advance extremity of said motion while the various punch-selecting devices are virtually stationary or have very little motion, said harmonic motion being impressed upon said punch-selecting devices through the medium of the general operator and the aforesaid set of register-bars which are keyed to said punch-selecting devices.

This is a division of my application Serial No. 204,249, filed July 8, 1927 (now Patent No. 1,864,714, dated June 28, 1932).

Other features and advantages will hereinafter appear.

In the accompanying drawings,

Figure 1 is a sectional side elevation of an Underwood-Hanson computing machine and the novel card-perforating mechanism of the invention. Only such features of the Underwood-Hanson machine are shown as relate to the invention, or serve to illustrate its operation in connection with the invention. Many details of the card-perforating mechanism, which are more conveniently shown elsewhere, are omitted.

Figure 2 is a side elevation, showing details of the usual Underwood carriage propelling and escapement-mechanism.

Figure 3 is a perspective diagram, illustrating the usual typewriter-carriage-controlled means whereby a clutch-pin may be automatically withdrawn at predetermined points in the carriage-travel to effect engagement of the usual driving motor with the computing mechanism.

Figure 4 is a diagram, showing in perspective a set of register-bars and indicating the means whereby the pins in the register-bars may be set by operation of the numeral or digit type-keys. There is also shown a nest of punches and the means keyed to and controlled by the register-bars, whereby punches are selected in accordance with the movements of said register-bars.

Figure 5 is a top plan view, showing the supporting stand on which the Underwood-Hanson typewriting and computing machine is regularly mounted. This view also indicates, in plan, how the novel card-perforating mechanism may be attached to and supported by said stand.

Figure 6 is a perspective view, serving to illustrate many details of the novel card-perforating mechanism.

Figure 7 is a top plan view of the novel card-perforating mechanism. There is included in said view a portion of the means whereby the punch-selecting devices are keyed to the register-bars, said register-bars being omitted from said view, however.

Figure 8 is a diagram, showing how the circuits for the electrical devices associated with the invention are arranged.

Figure 9 is a sectional side elevation through the novel card-perforating mechanism, illustrating in detail a column of digit-punches, the means for mounting same, the means movable along said column of punches for selecting a punch, and the means for causing the selected punches to punch.

Figure 10 is a sectional front elevation taken on line 10—10 of Figure 9, illustrating the means, as seen in said front elevation, for mounting the punches, and the means for selecting said punches and causing same to punch.

Figure 11 is a perspective diagram, illustrating details of the escapement-mechanism for controlling the card-carriage of the perforating mechanism, said details appearing in said diagram as viewed from below the perforating mechanism.

Figure 15 is a diagram, showing an illustrative work-sheet and corresponding record-card, and how the usual Underwood-Hanson selector-dogs and tabulator-stops are set on the typewriter-carriage in accordance with the forms on said work-sheet and card.

Figure 16 is a side elevation, showing the operated positions of a register-bar, punch-selecting device, and the means including the general operator for moving said register-bar and punch-selecting device. The means which cause the selected punch to punch are also shown in operated position, and there is also shown how said latter means are operatively connected to the reciprocatory member that moves the general operator back and forth.

Figure 17 is a side elevation, showing the operated positions of parts which are involved in effecting the power-driven return of the typewriter-carriage and of the card-carriage.

Figure 18 shows, in perspective, details of the parts which constitute the clutch, whereby the means for feeding one card at a time into the card-carriage are engaged and disengaged; said parts being shown separated.

Figure 19 is a view showing, in perspective, details of the perforating-mechanism carriage, said view illustrating the carriage-returning clutch as engaged to return the carriage. This view also shows electrical contact-devices which are caused to be joined by the engagement of said clutch and which serve to maintain current through the motor until the card-carriage is fully returned.

Figure 20 is a top plan view of fragmentary portions of a card and card-carriage, and shows the latch that holds said carriage as it receives a card.

Figure 14:
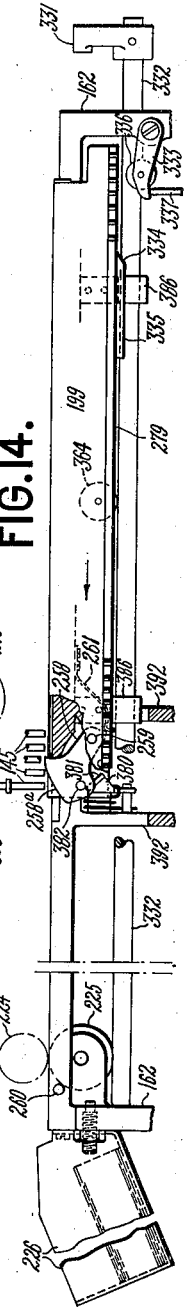
Figure 14 is a front elevation, illustrating particularly means applied to the card-carriage whereby a card is retained endwise in said carriage. Other details of the perforating mechanism and card-carriage are also shown in this figure.

Figure 21 is a front elevation, showing how the card-retaining means mentioned in the description of Figure 14 are withdrawn when a card is to be ejected from said carriage.

Figure 22 is a sectional side elevation through the perforator, showing particularly the operated position of the card-picker at the point of its movement when it is about to present an edge of the card to the feed-rolls, which complete the movement of said card, into its position in the card-carriage. There is also shown in this figure how pins, which retain the card in said carriage edgewise, are withdrawn while the card is being fed into said carriage.

Figures 23 and 24 are sectional plan views, showing the arrangement of parts that control the operation of the perforating mechanism and their manner of operation.

Figure 25 is a side elevation, showing the assembled clutch mentioned in the description of Figure 18, whereby the picker-knife is caused to be engaged and disengaged to feed a card into the card-carriage.

The general arrangement of the embodiment of the invention is best seen in Figure 1, which shows an Underwood-Hanson computing machine of the type shown in numerous patents; as, for example, the United States Patent No. 1,254,627, to F. A. Hart, dated January 22, 1918; many details, which do not pertain to the invention, being omitted. In the typewriter of said machine the usual keyboard includes numeral-keys 30, which, through the usual type-actions generally indicated by the number 31, may cause types 32 to print against a platen 33 mounted upon an axle 34, journaled in the sides of the usual platen-frame 35. Said platen-frame is shiftable up and down for case-shifting by means which include a case-shift-frame 36 and a case-shift-lever of which only the rear portion 37 is indicated. Said platen-frame 35 is mounted in a letter-feeding carriage 38, which moves to and fro upon rails 39 and 40, said rails being supported by the typewriter-frame 41. In Figure 2, there is shown the usual spring-drum 42 for propelling the carriage and the escapement-mechanism for controlling the letter-feeding steps of said carriage, said escapement-mechanism being generally indicated by the number 43.

The computing mechanism of the Underwood-Hanson computing machine is below the typewriter and includes one or more registers, which are conventionally indicated and which have dial-wheels 44. Said dial-wheels are driven in one direction only by means of one-way connections, not shown, to racks 45. Said racks are formed on bars 46, which also carry settable pins 47, whereby the extent of movement of the several racks may be determined. As the extent of movement of each bar 46 depends upon the digit to be accumulated by means of said bar, there are usually provided in each bar nine pins, one for each digit. The lower ends of said pins 47 are normally flush with the lower edge of the bar 46 and thus normally clear the path of a bar 48, which reciprocates to and fro for the purpose of moving the bars 46, which will hereinafter be called pin-bars or register-bars. To set a pin 47, it is depressed endwise, causing its lower end to project beyond the lower edge of the bar 46 and into the path of the general-operator bar 48. The pin is usually latched in its operative downwardly-projecting position (Hanson Patent 1,271,311 of July 2, 1918). The amount of movement which the register-bar receives from the movement of the general-operator bar depends, of course, upon which pin is depressed. The return movement of the bars during which the dial-wheels 44 are held stationary, by reason of the aforesaid one-way drive and the usual detenting means (not shown), is also effected by means of the general-operator-bar 48, which in this case encounters a projection 49 extending from the lower edge of the register-bar, thereby causing said bar to be returned against a stop-plate 50, which also has slots 51 that guide the bars at their rear ends. The general-operator bar 48 returns the register-bars to within a short distance of the stop-plate 50, the return movement of said bars being completed by means of a spring 52, which cooperates with a nose 53 on said bar to effect the full return of said bars. In this manner, when the bars are fully returned there is left a gap 54 between each register-bar and the general-operator bar, said gap permitting the register-bar to have an endwise movement sufficient to bring its pins into setting position in line with the pin-setting bars 55 of the usual pin-setting frame, generally indicated by the number 56. Normally, the pins 47 of the register-bars are not directly under the pin-setting bars 55, but occupy positions in planes midway between said bars. Each pin-setting bar 55 is part of a parallel-motion linkage actuated by a transverse shaft 57. There is one such shaft for each digit or numeral key, and each shaft has at its forward end an arm 58, whereby it may be rocked by the descent of the usual stem 59 depending from the corresponding digit or numeral key and which moves downwardly whenever said key is depressed. Figure 4 indicates the arrangement of the aforesaid parallel-motion linkages and the transverse shafts for actuating the same. Said Figure 4 also gives an indication of the manner in which said shafts may be rocked by depression of the numeral or digit keys.

The register-bars 46 are moved endwise one by one in denominational order as the typewriter-carriage moves step by step through a predetermined zone, each step serving to bring the pins 47 of a bar in line with the pin-setting bars 55. A register-bar having been brought into pin-setting position, one of its pins will be depressed or set by operation of a numeral-key, whereupon the typewriter-carriage escapes and takes another step in which the next bar is moved endwise, while the preceding bar, urged by the spring 52, returns to its normal position. For moving the register-bars endwise to pin-setting position through the letter-feeding steps of the carriage, there are provided the usual jacks 61 and push-rods 62 at the rear of the typewriter. For each register-bar there is an individual train including a jack, a push-rod, and a lever which is one of a series of levers 63 engaged by the lower ends of the push-rods. The typewriter-carriage moves from right to left, and as the register-bars 46 must be indexed in order from left to right, there is employed therefore, to transpose the order of impulses which the register-bars 46 receive from the rods 62, a series of transposing levers 65, each having an arm 66 which engages one of the levers 63, and an arm 67 which engages the corresponding register-bar, each of the arms 66 being connected to a corresponding arm 67 by a bail 64 (see Figure 4). The transposing device is of the type shown in United States Patent No. 1,370,360 to H. L. Pitman, dated March 1, 1921.

For determining which zones of the carriage-movement are to be effective to cause the pins in the register-bars to be set, there is provided for each zone a selector-dog 68 which, in accordance with the location of each zone on a worksheet, is shiftable and settable along the usual rods 69 and 70 which are mounted on the typewriter-carriage, and which extend in the direction of travel of said carriage. The selector-dogs have tappets 71 which encounter the forward ends of the jacks 61, and, in displacing said ends, cause said jacks to rock about their pivots 72. If the computing mechanism is provided with more than one register, there is provided a set of jacks 61 for each register, and the array of forward ends of one set of jacks is offset from the array of forward ends of other sets of jacks, the tappets 71 of the selector-dogs 68 being correspondingly offset. In this manner a selector-dog may only co-operate with its own set of jacks. The selector-dogs 68 are tiltable downwardly about the rods 69, so that the tappets thereon may be withdrawn from the plane of the forward ends of the jacks; such withdrawal being effected under circumstances, as, for example, while the carriage is being tabulated by means of the regular tabulator-keys 73, or while the platen is in upper-case position. For holding the selector-dogs 68 in operative position, there is provided the usual frame 75 which carries a roll 76 having conically-shaped ends and supporting the rearward ends of said selector-dogs 68, said dogs having conical rolls 77 which bear upon said rolls 76. There is usually one of said frames 75 and therefore one of said rolls 76 for each set of jacks, and the selector-dogs are only raised to operative position as the rolls 77 thereon pass over one of the frame-rolls 76. The frames 75 are mounted upon a rock-shaft 78. By means of an arm 79 projecting from the case-shift frame 36, which swings about the axis of a rod 74, the rock-shaft 78 may be rocked to withdraw the dog-supporting frame-rolls 76 when the platen is moved to upper-case position, said arm 79 co-operating for this purpose with an arm 80 extending from said rock-shaft 78. Also, depression of any tabulator-key 73, mounted on a corresponding tabulating key-lever 73ª, to raise a tabulating stop 81, causes said rock-shaft 78 to be rocked by means of an arm 82 which is operatively connected to said rock-shaft by means of a link 83 and an arm 84, which arm 84 extends from said rock-shaft, said arm 82 extending from the universal bar-shaft 85 which co-operates with the tabulating stop 81, there being a stop for each denomination, the several stops 81 co-operating with counter-stops 102 settable along the usual notched rod 64a of the typewriter-carriage. The rock-shaft 78 may also be rocked to cause the selector-dog 68 to drop whenever the usual non-add key (not shown) is operated; said key when operated being effective to swing a lever 86 of which only a fragmentary portion is shown, said lever co-operating with an arm 87 projecting from said rock-shaft 78.

The computing mechanism is in a casing 88, the upper portion of which also serves as a support for the typewriter, said casing being in turn supported upon a plate 89 which is the top platform of the supporting stand for the whole mechanism.

The general-operator bar 48 is part of the reciprocatory frame or general operator which includes two racks 90, one at each side of the casing 88, the general-operator bar 48 spanning said racks and being supported between plates 91 fastened to the sides of said racks. Driving connection is made to the left-hand rack at 92 (Figure 1) by a reciprocatory member 93 driven to and fro by a crank 94, which is housed and guided within a transmission casing, generally indicated by the number 95. Said transmission casing 95 also houses the usual reducing gearing and the clutch, neither of which is shown, and whereby said crank may be connected to an electrically-driven motor 96. The clutch includes an endwise movable pin 97 which projects above the transmission casing 95 and said endwise movement serves to condition the clutch to connect the crank 94 and the motor 96, that is to say, raising of the pin 97 releases the usual clutch-member and causes the crank to revolve (one revolution), the return of the pin 97 to normal causing the pin to intercept said clutch-member, to thereby effect the arrest of said crank 94 after said one revolution.

The raising of the clutch-pin 97 to initiate an operating cycle of the computing mechanism may be effected by depressing the usual manual key 98 to swing a lever 99 downwardly about a fulcrum 100, said lever in turn rocking a transverse lever 101, the inner end of which engages said pin 97, the latter lever 101 being pivotally supported upon the supporting stand-plate 89 by the usual means not shown in detail.

A computing machine cycle may also be initiated automatically through movements of the typewriter-carriage. Thus, for example, as the typewriter-carriage leaves a computing zone, tripping means may be actuated whereby the withdrawal of the clutch-pin 97 is effected. Figure 3 shows, in perspective, the usual tripping means, whereby movement of the typewriter-carriage effects withdrawal of the clutch-pin 97. The usual stops 102, settable along the typewriter-carriage, which co-operate with the tabulating stops 81, are each provided with a tappet 103 which displaces the end of a lever 104 and thereby rocks the same about a pivot 105. The rocking of said lever causes, by means indicated in Figure 3, the end 106 of a bar 107 to be withdrawn from the end of a spring-pressed lever 108 which is thereby rocked and which thereby depresses a vertical slide 109, which in turn rocks the lever 101 to raise the clutch-pin 97. The tappet 103 of the tabulating stop may rock the lever 104 and be clear thereof in one step of the typewriter-carriage. The pin 97 need be raised only for a moment, that is, just long enough to release the aforementioned clutch-member.

During a computing machine cycle all digits set up in the register-bars are accumulated during the forward movement of said bars. All pins 47 that were set for said digits in the register-bars are caused to be restored toward the end of the return movement of said bars, by means of a flat plate 136, which, by means of the usual linkage generally indicated by the number 137, is constrained to move upwardly with its surface always parallel to the lower edges of the register-bars; the upward movement of said plate serving to restore the pins and being effected by means of a one-way dog 138 pivoted to one of the rack-bars 90, said dog displacing the end of an arm 139 which is keyed to a shaft 140 and causing said shaft to be rocked. By means of arm 141 keyed to said shaft 140, said pin-restoring plate 136 is raised by the rocking of said shaft. The raising of said plate having just been effected as the racks 90 reach the end of their return movement, the end of the arm 139 drops off the tip of the dog 138 again, thereby permitting said pin-restoring plate 136 to reassume its normal position. In the forward movement of said racks, the tip of the dog 138 is diverted, being displaced by the end of the arm 139 in said forward movement, said dog being normally but yieldingly held by the spring 142 against a stop 144 in the rack 90. During the return movement of the register-bar, the usual carrying mechanism (not shown) becomes operative. Said carrying mechanism is of the type described in the aforesaid Patent 1,254,627 to Hart.

In the means for returning the typewriter-carriage by power, there is provided on said carriage a rack 110 which meshes with a pinion 111 rotatable on or with a shaft 112 journaled in a bracket 113 which is attached to the typewriter-frame 41. Said shaft 112 is driven by the motor 96. For connecting said shaft to the motor, there is provided thereon a pulley 114, which, by means of a belt 115, is connected to an aligned pulley 116 located below the plate 89 of the supporting stand. A driving pulley 117 on the motor-shaft is located as shown in Figure 1, and is connected to the pulley 116 by means of a jack-shaft 118 which has a pulley 119 in line with the motor-pulley 117, and which is connected to said pulley 117 by a belt 120. Thus, the shaft 112 rotates when the motor 96 rotates, and rotation of said motor may thereby serve to return the typewriter-carriage. The carriage-returning pinion 111 is normally operatively disconnected from the shaft 112 and is movable endwise therealong to effect connection for which purpose it is also provided with clutch-teeth which may co-operate with similar clutch-teeth of a driving member 121 which is keyed to said shaft. As the pinion 111 is slid toward said driving member 121, the respective clutch-teeth of the driving member and pinion interlock, causing said pinion 111 to rotate and drive the carriage when the shaft 112 is rotated.

For causing the carriage-returning pinion 111 to move into and out of engagement with the toothed member 121, there is provided the usual key-controlled spring-pressed train of linkage, generally indicated by the number 122, one end of which engages a groove in the carriage-returning pinion 111, and the other end of which consists of a latch-bar 123 having a notch 124, whereby the end of said train of linkage is caught in a front plate 125 of the typewriter, said plate having a slot through which the latch-bar passes.

A spring 126 urges the latch-bar 123 rearwardly, and said latch-bar is movable upwardly sufficiently to cause the holding edge of the notch 124 to be freed of the plate 125, whereupon the pull of the spring 126 causes the engagement of the carriage-returning pinion 111 with the driving clutch-member 121. The usual carriage-return-key 127 on the spring-pressed lever 128 serves to displace the latch-bar 123 upwardly for the purpose of initiating a power-driven carriage-return-movement, said lever being spring-pressed to yieldingly hold it in normal position. Said carriage-return-movement is terminated automatically as the carriage reaches the usual right-hand carriage-stop, not shown in particular detail, but which has associated therewith a dog 129 which is splined to a rock-shaft 130, at the right end portion of which is an arm 131. As a cam-faced tappet 132 mounted upon the typewriter-carriage encounters said dog 129, the shaft 130 and arm 131 are caused to be rocked, and their movement is used to withdraw the carriage-returning pinion 111 from the driving member 121, the withdrawal being effected by means of linkage 133 which connects said arm 131 to the aforesaid train of linkage 122, which serves to move the carriage-returning pinion 111.

The motor 96 is not a continuously running motor when the machine is in operation, but is only run when the general operator is to be actuated to accumulate an item; or when the carriage is to be returned. For starting the motor when an item is to be accumulated, there is, within the transmission-casing 95, a switch (not shown) controlled by operation of the manual key 98 when it is pressed to initiate a cycle of the computing mechanism, said switch being described in the aforesaid Patent 1,254,627 to Hart.

For starting the motor when a carriage-return-movement is to be initiated, and for maintaining the operating circuit for said motor independently of the switch in the transmission-casing when a computing machine cycle and carriage-return-movement are initiated simultaneously, there is provided another switch generally indicated by the number 134, Figure 1. Said switch is caused to be closed by the clutch-engaging movement of the train of linkage 122, which movement ensues upon pressing the carriage-return-key 127. In order that the movement of said linkage may control said switch, there is the usual controlling link, bar or rod 135 extending from said switch to said train of linkage. Said controlling link 135 engages a spring-pressed switch-member and by its endwise displacement serves to permit closure of the switch when the carriage-returning clutch is closed and also to open the switch when said clutch is opened.

The novel card-perforating mechanism and its relation to the computing mechanism will now be described.

The card-perforating mechanism is designed to produce perforations 143 in a record-card such as is shown in Figure 15. The card is divided into zones which define the items to be recorded therein. In said Figure 15 there is also shown an illustrative work-sheet in position around the typewriter-platen, said work-sheet being also divided into zones which define the items to be written thereon. As will be shown presently, some of the items written on the work-sheet are also accumulated in one or more registers of the computing mechanism. Furthermore, while writing the items on the work-sheet, the novel card-perforating mechanism is controlled to the end that some or all of the items written on the work-sheet will be recorded in the record-card by means of the perforations 143. In the card-perforating mechanism, a gang or nest of punches 145 is provided, said nest of punches being arranged in say five denominational columns, as herein shown, each column having nine punches, one for each digit.

The denominational columns of punches extend in a direction which is the same as the direction of movement of the register-bars, and it is a feature of the invention that the selection of the punches is controlled by the extents of movements of some of the register-bars. A punch-selecting device which may co-operate with a register-bar is accordingly provided for each denominational column of punches, said device serving to render effective in said column the punch which corresponds to the digit indexed in the corresponding register-bar. Said punch-selecting device is preferably in the form of an endwise movable slide 147, each slide carrying a plunger 148, which may be made to register with any one of the several punches by moving said slide 147 endwise. The lower end of the plunger 148 normally clears the upper ends of the punches and is held clear by means of a spring 149 which normally retains the plunger in its upward position against suitable stopping means which may be in the form of a turned-over tab 150 reacting against an adjacent edge of the sliding bar 147 (Figure 10).

If, as is in the computing mechanism herein shown, the intervals or spaces which define the extents of movements of the register-bars are not the same as the intervals or spaces between the punches but are actually somewhat less than said spaces, a multiplying leverage may be used as part of the means that serve to connect each punch-selecting slide 147 to the register-bar which is to control the movement of said slide. The means connecting a punch-selecting slide 147 to a register-bar consists therefore of a lever 151 swinging about a fulcrum 152, said lever being connected to the slide 147 at a point further from the fulcrum than is the point to which is connected a link 153 extending from said lever to the corresponding register-bar. On account of the arc which the first-mentioned point describes as the lever swings about its fulcrum, said first-mentioned point is not directly connected to the sliding bar but is connected thereto by a link 154. Other means may be used to connect the slide 147 to corresponding register-bars for simultaneous movements of corresponding but dissimilar extents, as, for example, compounded pinions and racks, the racks forming part of the slides and register-bars.

In the computing mechanism herein shown, there are provided three registers, each of which includes eight register-bars. To illustrate the invention, the punch-selecting slides 147 are shown as being controlled by and connected to the last five bars of the middle register. There may be a column of punches for each register-bar, or there may be a smaller number of punch-columns than the five columns herein shown. As best shown in Figure 4, the transverse spacing of the columns of punches, that is, from column to column, is less than the transverse spacing of the register-bars, so that it is necessary to make the rearward ends of the connecting links 153 converge. It is also desirable that the nest of punches be arranged symmetrically, in a transverse direction, in respect to the group of register-bars which control the selection of said punches. The punch-selecting slides 147 may be retained and guided in slotted plates 155 which are incorporated in the general structure of the perforating mechanism. Cross-pieces 156 attached to said plates may bridge the slides 147 and the slots in which said slides are guided, thereby serving, in conjunction with the bottom of said slots, to retain the slides edgewise.

The punches 145 have their upper and lower end portions guided respectively in plates 157 and 158, said plates being separated by bars 159 which are also incorporated in the general structure of the perforating mechanism, as indicated in the drawings, and which, with said plates 157, 158, form a frame for retaining the punches. A die-plate 160 co-operates with the punches in punching a card and has its shearing surface flush with a table-like surface 161 of what may be called a body-member 162 of the perforating mechanism.

The bottom-surface of the lower punch-guiding plate 158 is separated from the level of said table-surface 161 by a gap 163 to permit the passage of a card beneath the lower ends of the punches, said separation being effected by means of a shim 164 between said lower plate 158 and table-surface 161 and an elevation 165 upon which the forward ends of the spacing bars 159 rest (see Figure 9). For retracting the punches after they have penetrated a card, there is provided for each punch a spring 166, the lower end of which reacts against the lower punch-guiding plate 158 and the upper end of which reacts against a shoulder formed by a collar 167 around the body of the punch, the opposite shoulder of said collar reacting in turn against the upper punch-guiding plate 157 when said punch is fully retracted by said spring.

It is evident that the several punch-selecting slides 147 with their punch-operating plungers 148 will have moved to such positions that said plungers are above certain punches when the computing mechanism register-bars 46, which control the movements of said slides, have reached the limit of their forward movements, and it is also evident that the punch under each plunger 148 then corresponds to the pin or digit which was indexed in the corresponding register-bar. At the end of the forward movements of the register-bars, the crank, which drives the general operator of the computing mechanism, is at dead center in respect to the reciprocatory member 93 which connects said crank to said general operator, so that at the end of the forward movement of the register-bars and punch-selecting slides 147, the motion of said slides is zero. As the crank 94 approaches and leaves said dead center, it is feasible, therefore, on account of said zero-motion to depress the punch-operating plungers to effect perforation of the card. The movement of the crank 94, therefore, as it approaches and leaves said dead center, is used as best shown in Figure 16, to actuate a train of plunger-depressing mechanism which is terminated at one end by a downwardly movable plate 168 whose surface includes an area within which the punch-operating plungers 148 move, the other end of said train terminating in a lever 169 pivotally mounted on the computing mechanism transmission-casing 95 and carrying a roll 170 which, for displacing said lever, is engaged by the end of the crank 94 as said crank approaches and leaves the aforesaid dead center.

The plunger-operating plate 168 is preferably moved in such manner that its surface is always perpendicular, throughout its movement, to the plungers 148 which it serves to depress. It is accordingly connected to a parallel-motion linkage best shown in Figures 1, 7 and 9. Said linkage includes two shafts 171 extending transversely of the plate, each shaft having at one end thereof a bell-crank-lever 172, and at the opposite end an arm 173. Said shafts 171 may be journaled in opposite plates 256 secured to the outer sides of the punch-frame-bars 159. The bell-crank-lever-arms which extend in a general horizontal direction and the arms 173 at the opposite ends of the shafts are pivotally connected to upturned ears 174 of the plunger-depressing plate 168. Downwardly-extending arms of the bell-crank-levers are connected by a link 175, so that both shafts 171 move in unison, thereby to obtain the desired parallel motion of the plunger-depressing plate 168. The forward bell-crank-lever may have its arm which is connected to the plate 168 prolonged in an extension 176, as shown in said Figures 1, 7 and 9, said extension being included in the previously-mentioned train of plunger-depressing mechanism, which also includes a jack-shaft 177 journaled in brackets 178 secured to the top plate 89 of the machine-supporting stand, as best shown in Figures 1 and 7. Said jack-shaft 177 serves to transfer the line of action of said train of plunger-depressing mechanism from a point opposite the lever 169 to a point below said extension 176 of the bell-crank-lever 172. There is accordingly keyed to said jack-shaft opposite the lever 169 a downwardly-extending arm 179 connected by a link 180, preferably of adjustable length, to said lever 169. An arm 181 is also keyed to said jack-shaft at a point below said extension 176 and is connected to said extension by a link 183. By employing the plunger-depressing plate 168, which embraces all the plungers, all the punches which are selected by said plungers are caused to punch simultaneously by operation of said plate. A card to be perforated is therefore punched by zones, that is to say, all the columns of a zone in which digits of an item are to be recorded by perforations have the perforations effected therein simultaneously in one operation of the plunger-depressing plate 168, this mode of operation being in accord with accumulating the denominational digits of an item simultaneously during the reciprocatory movement of the register-bars 46.

The card is, as already stated, divided into item-defining zones and the means, and the manner of operation thereof, whereby a card is taken from a supply-stack and fed transversely of the punches zone by zone, will now be described. Means for holding a supply-stack of blank cards, from which the cards to be perforated may be drawn, include a rearward extension 185 of the table-like surface of the perforator-body-member 162 upon which a stack 186 of blank supply-cards may rest. The lateral and rear sides of the stack may be retained by pins 186ª projecting upwardly from the surface upon which the stack of cards rests. The front side of the stack abuts the throat-block 187, which bears upon the card-supporting surface of the body-member 162 only at its end portions, so as to afford a narrow aperture 188, which will permit the passage of only one card at a time. The throat-block is cut away or relieved to define the limits 187ª of said aperture lengthwise of the throat-block, as shown in Figure 6.

Figure 12:
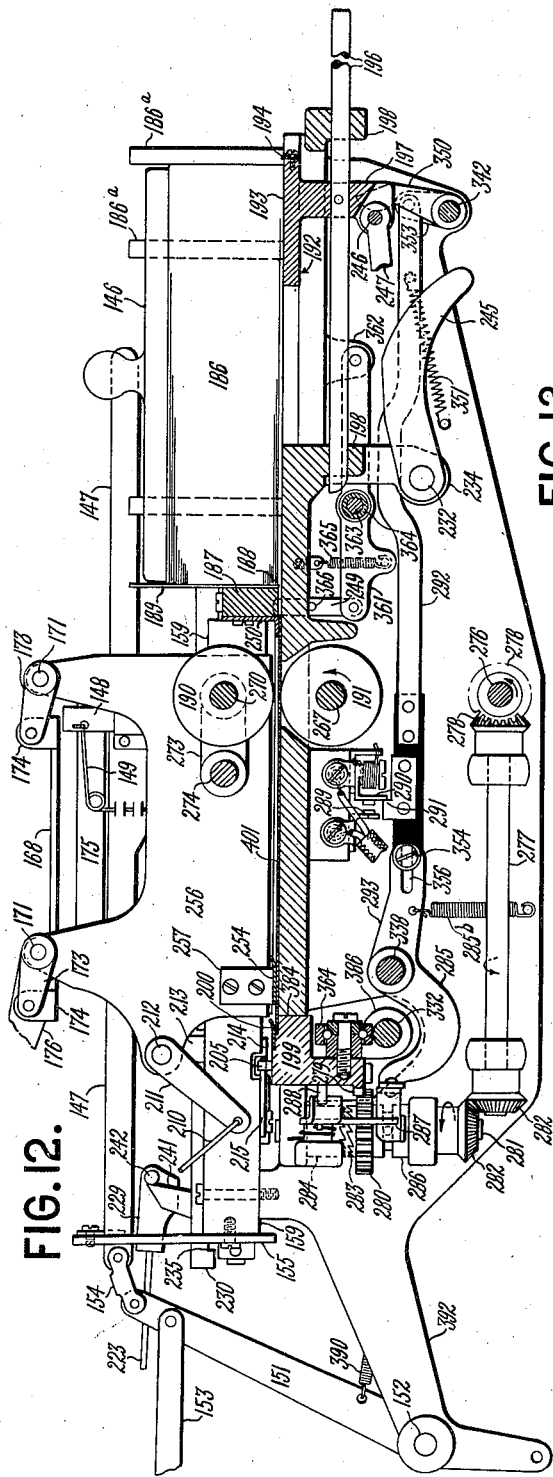
Figure 12 is a sectional side elevation through the perforating mechanism, illustrating particularly the clutch whereby the card-carriage may be engaged to effect its return movement, and means for controlling said clutch. There are also shown in this view some details of the means for feeding one card at a time into the card-carriage from a supply-stack.

As best shown in Figure 12, the inner side of said block 187 may have attached thereto beyond said limits of said aperture stack-retaining plates 189, the tops of which may be even with the tops of the pins 186ª, so that a supply-stack of a height corresponding to the height of said pins may be provided for.

The cards are slid one at a time from the bottom of the supply-stack and pushed through the throat-aperture 188, so that the leading edge of the card may be gripped by revoluble upper and lower feed-rolls 190 and 191 which continue the forward movement of the card in a manner to be presently described. For thus pushing one card at a time towards said feed-rolls, there is provided a reciprocatory card-picking device whose general construction is substantially the same as similar devices that are well known. Said device consists of a member 192 mounted for reciprocatory movement in the perforator-body-member 162 in such manner that a surface 193 thereof is substantially flush with the table-surface of said body-member. Secured to the rear edge of said reciprocatory member 192 is a picker-knife 194 having a shear-like edge which projects above said surface 193 to such an extent that only one card at a time may be picked or pushed from said stack during the forward movement of said device. To enable said picker-knife to readily engage the edge of the bottom card, it may be well to elevate the surface 193 of the card-picker-member 192 slightly, say five thousandths of an inch, above said table-surface. Said card-pushing reciprocatory member 192 may slide in guides formed by depressions 195 in the card-supporting surface of the extension 185 and may be retained in said guides by means of a rod 196, which is held in a downward extension 197 of said member, and is guided in opposite bearings 198 of the body-member 162 of the perforator-mechanism. A weight 146 presses downwardly on the supply-stack and thereby facilitates the pushing of the lower card through aperture 188. The means for reciprocating the member 192 will be described later.

What may be called a card-carriage is employed to move the card zone by zone past the punches after said carriage receives a card from the supply-stack. Said carriage is mounted for movement in a direction at right angles to the direction from which it receives a card from the supply-stack. In the preferred form of the invention the card-carriage is of such form that it moves the card lengthwise by pushing upon one corner thereof, said card-carriage being therefore preferably in the form of a rod 199 having several attachments and formations to be described, and an upward projection 199ª whereby said carriage may push against said corner of the card. As best shown in Figure 19, said projection 199ª is formed by a bent-over portion of a strip 200, which is elevated sufficiently above the top surface of the carriage 199, as shown in Figure 12, to form with said surface a card-retaining slit in which a lengthwise edge of the card may be received. When the card-carriage is to receive a card from the supply-stack, it is held in such position, by means to be presently explained, that the projection 199ª is just to the right of a line through the right edge 201 of a card as it is advanced from the supply-stack. By means of a spring-motor 202, Figure 19, and draw band 203, the card-carriage is drawn toward the left to bring its several zones into punching position under the punches. Before describing the means whereby the card-carriage is positioned for said several zones, it may be stated at this point that the upper feed-roll 190 is caused to be raised slightly to free the card, so that said card may be free to move endwise with the card-carriage after having been advanced by the feed-rolls into position in said carriage. The means whereby the upper feed-roll 190 is thus raised will also be described presently.

An escapement-mechanism controlled by operation of the tabulating keys of the typewriter is provided to effect the zone-determining steps of the card-carriage. Said mechanism is controlled by operation of the typewriter-tabulating keys for the reason that when the typewriter-carriage is tabulated to a new zone, the card is, as a rule, also tabulated to a corresponding zone, there being, however, exceptions, as, for example, when the typewriter-carriage is tabulated for a zone on the work-sheet in the typewriter for which there is no corresponding zone in the card. In such case, the escapement-mechanism may be operated to move the card-carriage idly in a manner which will be explained.

The card-carriage escapement-mechanism includes a number of settable stops 205, in the form of pins, which may be pushed into and retained in any one of a series of holes 206 in the card-carriage 199, and disposed along the upper surface thereof, the holes being spaced the same as the spacing of the denominational columns of the punches and of the card. A vibratory dog-member 207 carrying a holding dog 214 and a stepping dog 215, said dogs being of the type usually employed in escapement-mechanisms, co-operates with the stops 205 to hold the carriage in its several zone-determining positions and also to permit the escape of said carriage from position to position. The mode of operation of said reciprocating dog-member and its dogs may be best understood by reference to Figure 11, which is a perspective view of the escapement-mechanism as seen from below the card-perforating mechanism. Whenever a tabulating key of the typewriter is operated there is exerted a pull upon a link 210, said pull, through the medium of an arm 211 attached to said link and keyed to a rock-shaft 212, serving to rock said shaft, so that another arm 213 also keyed to said shaft and having its end pivotally connected to the dog-member 207 may push said dog-member forwardly. The fixed or holding dog 214 is thereby moved just ahead of and against whichever stop 205 was just previously engaged by the spring-pressed stepping dog 215 pivotally mounted upon said dog-member 207. As the fixed or holding dog 214 thus moves ahead of a stop 205, the spring-pressed stepping dog 215 escapes from said stop, and by its spring 215ª is caused to be diverted to the opposite side of said stop. When the direction of movement of the dog-member 207 is caused to be reversed by withdrawing the pull on the link 210, the fixed or holding dog 214 is withdrawn from the stop, whereupon the carriage escapes, and, under the pull of its spring-motor 202, moves until the succeeding stop 205 thereon encounters the stepping dog 215 and swings said stepping dog to its holding position, wherein said stepping dog strikes against a stop-plate 216, which may be supported by the dog-member 207. One end of the reciprocating dog-member is, as already explained, connected to the arm 213. The opposite end of said dog-member is reduced to the form of a rod 217, which may be conveniently guided in the plate 155 that guides the front ends of the punch-selecting slides 147. A spring 218, which may be applied as shown in Figure 11, causes the dog-member 207 to react against the pull of the link 210 and serves, when the pull of said link is withdrawn, to pull said dog-member to its normal position wherein a collar 219 on the rod 217 formed on said dog-members bears against said plate 155. One end of said spring 218 is anchored to a pin 220 projecting from the dog-member 207, and the other end of said spring may be anchored to a screw 221, which may also serve to secure the arm 213 to the shaft 212.

In order that a pull may be exerted upon the link 210 whenever a typewriter-tabulating key is operated, said link is connected to the arm 82 of the typewriter denominational tabulator-mechanism at the rear of the typewriter. By means of the universal bar 85ª of said tabulator-mechanism, the outer end of the arm 82 is swung upwardly every time a denominational stop 81 is elevated by depression of a tabulator-key 73, said universal bar 85ª being operable by any one of the stops 81 and keyed to the rock-shaft 85 to which said arm 82 is also keyed. The upward movement of said end of the arm 82 causes the aforesaid pull upon the link 210. The end of said link 210 connected to the arm 82 has a pin-and-slot connection 209 to said arm, as shown in Figure 1, to permit movement of said link independently of said arm 82, for a purpose which will later become evident.

Referring to Figure 3, the elevation of any one of the tabulating stops 81 into the path of the counter-stops 102 serves to arrest the typewriter-carriage. The lever 104, which functions to automatically initiate a cycle of the computing mechanism by movement of the typewriter-carriage, is displaced by a counter-stop 102 when the tappet 103 of said stop passes beyond the field of the stops 81, a pawl 222 on said lever being disposed beyond said field of stops 81. In this manner, every time a numeral key is depressed for writing in the last column of a work-sheet zone, the carriage takes the usual letter-feed step, thereby causing a counter-stop 102, which has functioned to arrest the typewriter-carriage, to pass out of the field of the stops 81, and a computing-machine cycle to be initiated, during which the punches of the perforator-mechanism are caused to penetrate the card, in accordance with the digits of the items set up to be accumulated during said cycle. After the perforator-card-carriage has moved the several zones of the card into punching position to be punched during corresponding cycles of the computing mechanism, it is required that the punched card be disposed of, and the card-carriage returned to its initial position to receive another card. In the preferred way of disposing of the card, there are employed revoluble card-feeding rolls 224 and 225 disposed at what may be called the delivery end of the table-surface 161 of the perforator-body-member 162. If no carriage-escapement stops 205 are set for intercepting the card-carriage after it leaves the position for the last zone to be punched, said card-carriage will, with the card, move towards said feed-rolls 224 and 225 when the card-carriage escapement-mechanism is operated, thereby causing the advancing edge of the card to be presented to said feed-rolls. Further movement of the card-carriage is arrested after it has presented its card to the feed-rolls while said feed-rolls deliver the card into a suitable receptacle 226, which may be attached to the aforesaid delivery end of the perforator-body-member 162, said receptacle being indicated in Figures 14 and 21. For thus arresting the card-delivering movement of the card-carriage, there may be provided an adjustable stop 227 in the form of a screw threaded into a lug 228 projecting from the perforator-body-member 162.

There may be occasions also when it is desirable to release the card-carriage, so that it may deliver its card to the delivery feed-rolls 224 and 225 before all the zones of said card have been presented in punching position; in other words, it may be desirable to release said card-carriage, so that it may deliver its card at any time at the will of the operator. A card-releasing movement of the dog-member 207 of the escapement-mechanism is therefore made of such extent that the dogs 214 and 215 thereon are completely withdrawn from the path of the stops 205 whenever a card is to be delivered. In this way there is avoided the necessity of withdrawing said dog-member once for every stop 205 that has not yet passed the dogs of said member when a card is to be delivered before all the zones thereof have registered at the punches.

The escapement-dog-member 207 is therefore fully withdrawn from the path of the stops 205 for releasing the carriage for card-delivery, such full withdrawal being effected irrespective of whether the carriage is at the end of its zone-determining travel, or in intermediate position between the beginning and end of said travel. Suitable linkage, operable by a key at the typewriter-keyboard, may be provided to effect full withdrawal of the dog-member 207. In the illustrated form of the invention, operation of the carriage-return-key 127 is used to effect withdrawal of the dog-member 207 for the reason that when the card-perforator-carriage is released to deliver its card, it is also desirable to initiate a return movement of the typewriter-carriage because the typewriter-carriage starts from an initial position when the card-carriage starts its zone-determining travel. Therefore, as a sequence to operation of the carriage-return-key 127 at the typewriter-keyboard, there is caused to be initiated a power-driven return movement of the card-perforator-carriage by means which automatically become effective as the carriage reaches the end of its card-delivering movement. Before explaining said latter means, however, the means whereby operation of the carriage-return-key 127 causes withdrawal of the dog-member 207 will be explained. The endwise movement of the switch-controlling link 135 of the typewriter-carriage-return-engaging linkage 122 is used to effect withdrawal of the perforator-escapement dog-member 207. The withdrawal is best effected by releasing a latched spring-pressed member incorporated in the card-perforator and which may be in the form of a bar or rod 230, best shown in Figure 9, said rod having one end pivotally connected to an arm 231 keyed to a rock-shaft 232 journalled at the end portion adjacent said arm in a bracket 233 projecting from the rear side of the perforator-body-member, said shaft being journalled at the other end in a bearing 234 (see Figure 6) projecting from the under surface of said body-member. The forward end of said rod 230 has a latching notch 235 engaging a suitable slot in the plate 155 when said bar 230 is in its normal position. Said bar 230 transmits the movement which it derives from the pull of a spring 236 upon the arm 231, to the dog-member 207 by means of the shaft 212, which, as already explained, also serves to displace said dog-member during operation of a typewriter-tabulating-key. Endwise movement of the dog-member withdrawing bar 230 accordingly rocks said shaft 212 by means of an arm 238 which is keyed to said shaft, said arm being, for this purpose, engaged by a pin 239 projecting from the side of said rod 230. The notched end of the dog-withdrawing rod 230 is raised to release said rod, and for thus raising said end, there is provided a bell-crank-lever 237 having an arm 240 disposed to lift the end of said bar, and an upwardly-extending operating arm 241 having an end of such shape that said end may be overridden by a pin 242, and thereby escape from said pin when said pin has moved forwardly sufficiently to rock said bell-crank-lever 237. The pin 242 is constrained to describe a path which will cause it to thus override said arm 241 by means of a cam-shaped edge 243 of a link-member 229 from which said pin 242 projects, said edge cooperating to this end with the edge of a suitable opening in the plate 155, in which said link-member is guided.

As shown in Figures 1 and 17, the link-member 229 is part of a link 223, which, in turn, is part of a train of connections (Figures 8 and 17) from the switch-controlling bar 135 of the typewriter-carriage-return mechanism, said connections including an arm 221a aligned with and engaging said rod 135, and another arm 209a aligned with and connected to said link 223, said arms being, in the present form of the invention, spaced apart and connected by a shaft 208 to which each of said arms is keyed. Said shaft may be journalled in bearings 204, which may project from the rear of a casing 184 that houses the switch 134 for the typewriter-carriage-return mechanism. A spring 208a serves to restore said train of connections to normal as the switch-controlling bar 135 is withdrawn concomitantly with the conclusion of the typewriter-carriage-return movement. During this restoration the pin 242 idly overrides the end of the arm 241 of the bell-crank-lever 237 irrespective of whether or not said lever has reassumed its normal position.

The reason for having the pin 242, in its forward movement, override and escape from the tip of the operating arm of the bell-crank 237 is to permit the unimpeded restoration of the dog-member actuating rod 230 without effecting or tending to effect restoration of the typewriter-carriage-return-engaging linkage 122, the operation of which has previously released said rod 230. Thus the typewriter-carriage-return linkage 122 may remain in its operated position, as shown in Figure 17, until the typewriter-carriage is fully returned, because, as is evident, particularly with a long typewriter-carriage, the return of the typewriter-carriage may take more time than the time necessary to return the card-perforator-carriage, the restoration of the escapement-controlling rod 230 being effected upon completion of the return of the card-perforator-carriage. Figure 17 shows the rod 230 in its unlatched position, as effected by operation of the typewriter-carriage-return-engaging linkage 122, and said figure also shows how the unlatching and endwise forward movement of said rod have effected the withdrawal of the dog-carrying escapement-member 207. The restoration of the rod 230, and consequently of said dog-carrying member 207, is conveniently effected by and during the forward movement of the reciprocatory card-picker-member 192.

It will now be seen that the rock-shaft 232 and the arm 231 thereon connected to the dog-withdrawing rod 230 serve as operating connections between said rod 230 and the reciprocatory card-picker-member 192, the operating connection being completed by means of a cam-shaped arm 245 keyed to said rock-shaft 232 and disposed in the line of movement of the reciprocatory card-picker-member 192. As shown in Figures 7 and 12, a stud 246, which also serves as a pivot for a connecting rod 247 whereby the reciprocatory member 192 may be moved back and forth, may engage the cam-shaped arm 245 at a predetermined point in the forward movement of said member, said point being determined by the shape of the cam-arm 245. As said stud 246 engages said cam-shaped arm 245 the latter is caused to be displaced, thereby rocking the shaft 232 and effecting restoration of the escapement-dog-carrying member 207 by withdrawing the rod 230 from the arm 238 and causing said rod to be latched again.

Means for retaining and guiding the card in its path of movement from its initial position, to which it was advanced from the supply-stack, to the card-ejecting feed-rolls 224 and 225, include the already-described strip 200 which forms a card-receiving slit extending lengthwise of the card-carriage, and also forming the projection 199a, whereby the card is pushed along. The edge of the card opposite said card-receiving slit is retained and guided along the path of zone-determining travel by means of retractible pins 249, a marginal guiding strip 250 and another guide-strip 251. The retractible card-guiding pins 249 are caused to be withdrawn during the advance of a card from the supply-stack to the card-carriage, and the marginal guiding strip 250, in order to permit said advance, merely overlies the margin of said card, and does not serve to engage and guide the edge of the card; the retractible pins 249 serving the purpose of guiding and retaining said edge of the card; and said marginal guiding strip 250 preventing the margin of the card from curling up or becoming otherwise distorted. The other guide-strip 251, which is disposed further along the path of card-travel, serves to guide both the edge and margin of the card, and may be secured to a side edge 252 of the card-perforator body-member 162, as best shown in Figure 7. The first marginal guide-strip 250 may be secured to the throat-block 187, as best shown in Figures 7 and 12. The card may also be guided during its advance from the supply-stack to the card-carriage by a lateral guide 253, which engages the right edge and margin of the card. The entry of the advancing edge of the card into the slit formed by the strip 200 of the perforator-carriage is facilitated by an intermediate guide 254, which may be formed from the same blank from which the lateral guide 253 is formed, the two guides 253 and 254 being joined at 255, see Figures 6 and 7. The opposite end of said intermediate guide 254 may be attached to one of the plates 256 at 257, as best shown in Figure 6. To prevent over-shooting of the card when the carriage is stopped in zone-determining positions, there is provided a retractible card-holding finger 258, which engages an edge of the card at the corner opposite the corner engaged by the card-pushing projection 199a of the card-carriage, said finger being also mounted on said carriage and traveling therewith. In order that the card-holding finger 258 may be withdrawn to permit ejection of the card, it is pivoted at 259 and has a cam-shaped edge 258ᵃ co-operating with a pin 260 to effect the withdrawal of said finger just before the carriage presents the edge of the card to the ejecting feed-rolls 224 and 225, said pin 260 projecting from a forward edge of the perforator-body-member 162, as shown in Figures 7, 14 and 21, Figure 21 showing how the pin and cam-shaped edge of the finger co-operate to effect said withdrawal. As it is desired to start the return movement of the carriage as soon as the ejecting feed-rolls have gripped the card, a detent 261 is provided and co-operates with a suitable formation of the finger to hold the finger in its withdrawn position as it recedes from the pin 260 when the carriage starts in its return movement. Said finger 258 is restored to its card-holding position in a manner to be presently described.

The card-perforator-carriage is preferably returned by power-driven means. The reciprocatory card-picker-member 192 is also preferably operated by power. The feed-rolls which advance a card from the supply-stack and the feed-rolls which eject a card into the receptacle 226 are also operated by power. The power required for these several purposes is preferably derived from the motor 96 of the combined typewriting and computing machine, and is transmitted to a primary shaft 262, incorporated in the perforator-mechanism, by means including a pulley 263 on said primary shaft 262, a pulley 264 on the motor-shaft and a belt 265 connecting said pulleys. The pulley 263 may be either directly keyed to the primary shaft 262 or, as shown in the preferred form of the invention, it may be connected to said shaft by means of a clutch 266, the purpose of which will be explained later. The primary driving shaft 262 of the card-perforator drives a shaft 267, to which are keyed the lower feed-rolls 191 that serve to advance a card from the supply-stack, the primary shaft 262 being connected to said shaft 267 by gears 268 and 269. The periphery of the lower feed-rolls 191 is slightly above the table-surface 161 of the perforator-body-member. The upper feed-rolls 190, co-operating with said lower feed-rolls, are keyed to a shaft 270, which may be geared to the lower feed-roll-shaft 267 by gears 271 and 272. During the zone-determining advance of the card, the upper feed-rolls 190 are raised from the surface of the card, this raising of the upper rolls being effected just as the card reaches the card-carriage in its advance from the supply-stack. To provide for raising the upper feed-rolls, their shaft 270 is journaled in arms 273, which are swingably mounted by being keyed to a rock-shaft 274, one end of which may be journaled in one of the fixtures 256, the other end being journaled in a bracket 275 fastened to the side of the perforator body-member 162.

Another shaft 276 serves to operate mechanism for reciprocating the card-picker-member 192. Said shaft 276 also drives a shaft 277 at right angles thereto, said latter shaft serving to return the perforator-carriage and being connected to the shaft 276 by a pair of gears 278. The shaft 276 is so disposed that it may be conveniently driven by the shaft 267 by means of a gear 244 keyed to said shaft and an intermediate gear 248 which connects said gear 244 to the gear 272 on the shaft 267. The intermediate gear rotates on a stud 244ᵃ projecting from the side of the perforator body-member 162. One end portion of said shaft 276 may be journaled in said side and the opposite end portion may be journaled in a bearing 276ᵃ depending from the bottom surface of said body-member, see Figure 6. The shaft 267 also serves to drive the card-ejecting feed-rolls 224, 225. The lower feed-rolls 225 are keyed to a shaft 225ᵃ which may be journaled in portions of the perforator body-member 162 as best shown in Figures 6 and 7, and said shaft may be driven by the shaft 267 through gears 226ᵃ. The portion of the shaft 267 adjacent said gears may be supported in a bearing 227ᵃ extending downwardly from the under surface of said body-member. The upper card-ejecting rolls 224 are spring-pressed toward the lower rolls 225 and are accordingly mounted on the ends of arms 228ᵃ made of resilient spring material. Said arms 228ᵃ are secured to a bar 229ᵃ which may in turn be secured, at one end, to the perforator body-member 162.

The means for returning the card-carriage by power will now be described. Referring to Figures 6, 12 and 19, it will be seen that the perforator-carriage is provided with a rack 279 so that it may be moved endwise by rotating a pinion 280, which meshes with said rack. Said pinion is slidable endwise upon a vertical shaft 281, which is driven by the shaft 277 through gears 282. The reason for making the pinion 280 slidable endwise is to permit its connections and disconnections from the shaft 281 through the medium of clutch-teeth 283, one set of which is formed in a member 284 keyed to said shaft 281, the other set being formed upon a collar of the pinion 280. A forked lever 285 serves to move the pinion 280 endwise into or out of engagement with the driving member 284, and engages said pinion through the medium of a circular groove 286 of the pinion. The forked lever 285 is spring-pressed by a spring 285ᵇ and is normally held in such position that the pinion 280 is disengaged from its driving member 284, said lever being thus held by means of a latch 287 pivotally mounted upon the perforator body-member 162 and engaging a tab 285ᵃ of said lever. A pin 288 projecting from the side of the perforator card-carriage may displace said latch, as shown in Figure 19, to thereby effect engagement of the pinion 280 with its driving member 284. This displacement of the latch 287 is effected as the card-perforator carriage reaches the end of its card-delivering movement determined by the stop 227, after being released from its escapement-mechanism by operation of the carriage-return key 127 at the typewriter keyboard.

It has been explained how operation of the typewriter-carriage-return-key starts the motor 96 running by closing the switch-contacts 134. Hence the shaft 281 will be rotating when the pinion 280 moves into engagement with the driving member 284 as a sequence to operation of said carriage-return-key, and the rotation of said shaft will thus serve to return the perforator card-carriage. If the typewriter-carriage has a short return movement, said movement may be terminated before the return of the perforator card-carriage is completed. As the switch-contacts 134 of the typewriter-carriage-return mechanism are caused to be opened upon completion of the typewriter-carriage-return movement, there is provided an auxiliary switch to keep the motor-circuit closed until the card-perforator carriage has been returned, the opening of said auxiliary switch being timed accordingly as will become evident. Said auxiliary switch also serves to keep the motor running while the reciprocatory card-picker member 192 advances a card and returns it to its normal position. The auxiliary switch includes, as best shown in Figure 12, a fixed contact-member 289 and a spring-pressed movable contact-member 290 normally held disengaged from the fixed contact-member 289 by a hook 291 formed on an endwise movable rod 292, the hook-bearing end of said rod being depressible and connected to an arm 293 of the carriage-return pinion-engaging lever 285 in the manner shown in said Figure 12. The end of said arm 293 of the lever 285 moves downwardly as the carriage-returning pinion engages its driving member, causing the hook 291 to be withdrawn from the spring-pressed switch-member 290, which thereupon closes upon the fixed contact 289 of the auxiliary switch.

As the card-perforator carriage is to receive a new card after having delivered the punched card, said carriage at a predetermined point of its return movement initiates a back-and-forth movement of the reciprocatory card-picker member 192 by means which will now be described. The connecting rod 247 by which the card-picker is reciprocated is connected to a crank 294 keyed to a short shaft 295, which may be journaled in bearings 296 projecting from the under surface of the perforator body-member 162. A rotatable member in the form of a ratchet 297 is loose on said shaft and is connected to or disconnected from said shaft by the operation of a clutch which is to be controlled by the return movement of the card-perforator carriage. During the return of said carriage, the ratchet 297 is being rotated on the shaft 295 by means of a gear 298 fastened to said ratchet and a pinion 299 meshing with said gear and keyed to the shaft 276 which is being rotated to effect said return movement.

Figure 13:
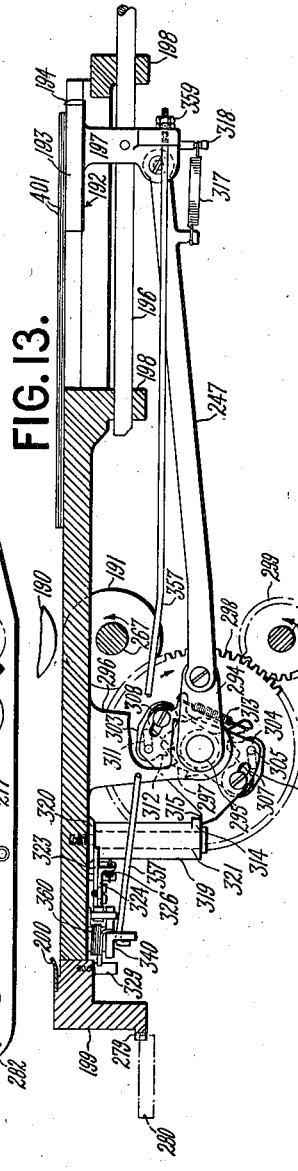
Figure 13 is a sectional side elevation through the perforating mechanism, showing further details of the means for picking one card at a time from the aforesaid supply-stack. This view also shows the clutch whereby said means are caused to be engaged and released.

The clutch for connecting the ratchet 297 to the short shaft 295 to begin the rotation of said shaft for feeding a card from the supply-stack and the mode of operation of said clutch may be best understood by referring to Figures 13, 18 and 25. Figure 18 shows in perspective the parts which constitute the clutch spread apart, that is to say, disassembled, and said figure also indicates how the parts may be assembled. The ratchet 297 with its attached gear which, as already explained, rotates loosely on the short shaft 295, constitutes the driving member of the clutch. The driven member 300 of said clutch has, as shown in Figure 18, arms 300ª extending in diametrically opposite directions, and said member has a hub 301 whereby it may be keyed to the shaft 295 by means of a pin 302. The double-armed-driven member 300 carries pawls 303, which may be engaged by diametrically opposite teeth of the ratchet 297. Normally the pawls are not engaged with the ratchet. A plate 304 carrying diametrically opposite studs 305 serves to hold the pawls 303 disengaged from the ratchet 297. Said plate 304 has a central hole 306 which fits the hub 301 of the double-armed member 300, and the plate is thus rotatable on said hub relatively to said member 300. A small relative rotation of said plate 304 and member 300 is used to cause engagement of the pawls 303 with the ratchet 297, or to cause disengagement of said pawls and ratchet. For limiting the pawl-controlling relative rotation of said plate 304 and member 300 and also for retaining said plate against said member, said plate is provided with arcuate slots 307 which are concentric with its central hole 306. Shouldered screws 308 are threaded into the pawls 303 at 309, the shoulders of said screws passing through holes 310 of the double-armed member 300 and through the arcuate slots 307 of the plate 304. The heads of said screws 308 serve to retain the plate 304, and by co-operating with the ends of the arcuate slots 307, said screws serve to limit the rotation of said plate 304 relatively to the member 300.

Each pawl is provided with a slot 311 which fits over one of the studs 305 carried by the plate 304. Said slots 311 are so inclined that a relative movement between the member 300 and the plate 304, during which the studs 305 move along said slots, causes each pawl 303 to be displaced so that its tooth 312 either moves into engagement or out of engagement with the teeth of the ratchet 297, thereby operatively connecting or disconnecting said ratchet 297 and the shaft 295. A spring 313 constantly urges such relative rotation of the member 300 and the plate 304 as will cause the pawls 303 to engage the ratchet 297. To oppose this engagement of the pawls 303, that is to say, to keep the pawls normally disengaged from said ratchet, there is provided a withdrawable catch 314 which may co-operate with a tooth 315 or other suitable projection of the plate 304 to effect the disengagement of the pawls 303 and ratchet 297 and to help to maintain this disengagement. The manner in which the disengagement is effected may be best understood by reference to Figures 13 and 25. Figure 25 shows in full lines how the catch 314 has been withdrawn, and has thereby effected engagement of said pawls and ratchet. Figure 13 shows the catch interposed in the path described by the tooth 315 of the plate 304, thereby effecting disengagement of said pawls and ratchet, the disengagement being effected by the relative rotation of the plate 304 and the member 300; said relative rotation being occasioned as the catch 314 intercepts the tooth 315 and thereby checks further rotation of the plate 304. Just as soon as the tips of the pawl-teeth 312 escape from the teeth of the ratchet there is no force urging further relative rotation of the member 300 and the plate 304, except the momentum of said member and of the train of which it forms a part, said momentum being in most cases sufficient to cause enough further relative movement between said member 300 and plate 304 to fairly withdraw the teeth 312 from the ratchet so that there may be no abnormal re-engagement of said teeth. To aid said momentum in effecting full disengagement of the pawls 303 from the ratchet 297, and also to maintain said disengagement, a spring may be applied to urge continued rotation of the member 300. Such a spring 317 is best applied as shown in Figure 13, one end of the spring being attached to the connecting rod 247, the other end being attached to a stud 318 projecting from a portion, adjacent the end of said rod, of the card-picker reciprocatory member 192. The pull of said spring 317, applied as shown, urges continued rotation of the member 300 and its attached train until the toggle formed by said connecting rod 247 and the crank 294 is straightened out, at which time the shoulders of the screws 308, threaded into said clutch-member 300, will react against the extremities of the arcuate slots 307 of the plate 304 which is checked by the catch 314. Thus the pawls 303 will be fully disengaged from the ratchet 297.

To provide for withdrawal of the clutch-controlling catch 314 from the tooth 315 at a predetermined point in the return movement of the card-perforator carriage, said catch is pivotally mounted as best shown in Figures 13 and 23, and is provided with an elongated hub 319 which extends upwardly to a finished boss 320 of the under surface of the card-perforator body-member. A pivot stud 321 extends through said hub and is threaded into said boss. At the upper end of said hub there is an arm 323 (see Figures 6 and 23) provided with a swingable spring-pressed extension 324, pivotally connected to said arm at 325 and whose rotation under the influence of a spring 326 may be checked by means of a downwardly-bent tab 327 of said arm and against which a side of the extension 324 reacts. The extension is of such length that its end 328 projects into the path of a stud 329 located at such a point on the card-perforator carriage that said stud encounters the end of the extension 324 to withdraw the catch 314 at the moment in the card-carriage-return movement when it is expedient to begin rotation of the shaft 295, the beginning of said rotation marking the beginning of the advance of a card from the supply-stack toward the carriage. In the advance of the card-carriage the swingable extension is idly turned about its pivot 325 as the stud 329 on said carriage encounters said extension. The spring 326 also serves to hold the arm 323 against a stop 322, thereby determining the normal position of the clutch-controlling catch 314. As soon as the stud 329, in the carriage-return movement, passes the extension 324, the catch 314 under the influence of the spring 326 reassumes its normal position and in time to intercept the clutch-plate-tooth 315 as said tooth completes its first revolution, thereby limiting the card-picker member 192 to one complete reciprocatory movement.

The speed with which the card is advanced from the supply-stack may be so timed that the leading edge of the card reaches its receiving slit, formed by the strip 200 of the card-carriage, just after said carriage has settled into its initial position after concluding its return movement. In said return movement the carriage moves somewhat farther than said initial position to provide for the slight variations in overthrow which attend the conclusion of the return movement and which conclusion is effected by withdrawing the carriage-returning pinion 280 from its driving member 284. The extent of overthrow of the carriage-return movement may be limited by means of a stop 331 which may be adjustably secured to a rod 332 that forms a guide-rail, as will be explained, for the card-carriage.

For disengaging the carriage-return pinion 280 from its driving member 284, the forked lever 285, by means of which said pinion is moved endwise, is given a reverse movement. Said reverse movement is impressed upon said lever 285 by displacing an arm 333 pivoted at the front edge of the right side of the perforator body-member 162, the displacement being effected by the card-carriage as said carriage approaches its return-movement-limiting stop 331. To displace said arm 333 the carriage accordingly is provided on its under side, as best shown in Figure 14, with an inclined cam-edge 334 followed by a dwell 335, said edge cooperating with a roll 336 of the arm 333 to displace said arm. Displacement of another arm 337 at right angles thereto and keyed to a shaft 338, as best shown in Figures 6 and 23, said shaft serving to connect said arm 337 to the carriage-return-pinion-withdrawing lever 285, which is keyed to the opposite end of said shaft which may be journaled in and span opposite sides of the perforator body-member 162.

The card-carriage 199, which, as already mentioned, is of rod-like form, may be guided as indicated in Figures 7, 9 and 12. Finished front and rear sides of said carriage may bear against and be thereby guided in ways formed in the perforator body-member 162, said ways including a front edge 384 extending the entire length of said body-member and an opposite shorter edge 385 located at about the middle of said entire length of the perforator body-member. In a vertical direction, the card-carriage may be retained and guided by means of the guide-rod 332, said guide-rod also extending the full length of the perforator body-member. The right end of said rod is extended to carry the previously-mentioned carriage-stop 331. For engaging said guide-rod the card-carriage may have attached thereto lugs 386 having holes elongated in a vertical direction so that only the lower surfaces of said holes engage the bottom of the guide-rod 332. One of said lugs is placed near each end of the card-carriage, and there is provided at the center of said carriage a roller-bearing 387 bearing upon the upper side of the guide-rod 332 and forming with said lugs what may be called a three-point bearing along said guide-rod.

The initial card-receiving position into which the carriage settles after concluding its return movement is indicated by a fragmentary plan view of the card and carriage in Figure 20. In said position, the pull on the carriage of its spring motor 202 reacts against a stop-arm 340, which may be pivotally supported on the under side of the perforator body-member 162 so as to be withdrawable from the previously-mentioned stud 329 projecting from the under surface of the card-carriage and which the end of said arm may abut to thereby hold said carriage in said initial card-receiving position. Thus the stud 329, besides serving to initate the advance of a new card, also serves to hold the card-carriage in its initial card-receiving position. In said initial position, the card-propelling projection 199ª of the card-carriage is a little to the right of the edge of the card so that the corner of said card as it advances from the supply-stack may not interfere with said projection.

The beginning and the end of the reciprocatory motion of the card-picker member 192 are used for several purposes which will now be explained. At the beginning of the forward movement of said card-picker member, and conveniently caused thereby, there is engagement of the upper feed-rolls 190 with the lower rolls 191 in order that said rolls may advance a card from the supply-stack when said card is presented to said rolls by the advancing card-picker member. The rod 292 bearing the auxiliary switch-controlling hook 291 is also caused to be advanced at the beginning of the forward movement of said card-picker member 192 so as to be ready to open said switch. To these ends there is provided a spring-pressed rock-shaft 342, best shown in Figures 6 and 23, and having an arm 350 abutting and co-operating with the connecting rod-stud 247 of said card-picker member to cause said shaft to rock in one direction at the beginning of the forward movement of said member and in the opposite direction at the end of the return movement of said member. As the card-picker member 192 moves forwardly causing its connecting-rod stud 246 to recede from the arm 350, the rock-shaft 342 on which said arm is keyed may be rocked by means of a spring 351, one end of which may be attached to the rod 292, the other end being attached to a stud projecting from the side of the perforator body-member 162. For effecting the engagement of said feed-rolls 190, 191, said rock-shaft has keyed to it an arm 344 connected by a link 345 to another arm 346, which is keyed to a short rotatable stud 347 journaled in the right side of the perforator body-member 162. Said stud has a cylindrical head 348 with a flattened side, the different distances of said flattened side and the cylinder of said head from the center of the stud serving to effect displacement of an arm 343 as said stud is rotated.

By means of said displacement of the arm 343 which is keyed to the shaft 274, by which the upper feed-rolls 190 may, as already explained, be swung, there may be effected engagement or separation of said upper rolls and the lower rolls 191. In the position of the stud-head 348, shown in Figure 6, the upper feed-rolls 190 will have been swung upwardly and separated from the lower feed-rolls 191. This position of the stud-head 348 is obtained as the reciprocatory card-picker member, reaching the end of its return movement, rotates the rock-shaft 342. Conversely, at the beginning of a forward movement of the card-picker member, there is caused opposite rotation, said rock-shaft thereby bringing the flattened side of the stud-head 348 opposite the side edge of the arm 343, which reacts against said head and is consequently displaced by the pull of a spring 349 applied at the end of said arm 343. The feed-rolls 190—191 are consequently caused to be engaged.

Rotation of the rock-shaft 342 at the beginning of the forward movement of the card-picker member 192 advances the auxiliary switch-controlling hook 291, the rearward end of the rod 292 to which said hook is fastened being pivotally connected to an arm 353 keyed to said rock-shaft. Conversely, the rod 292 with its hook 291 is pulled rearwardly when the reciprocatory card-picker member 192 has completed its rearward stroke. In the forward stroke of the rod 292, the arm 293 of the carriage-return pinion-shifting lever 285 is in depressed position and the forward end of said rod 292 and the hook 291 are also depressed, said forward end being, by means of a stud 354, slidable along a slot 356 at the end of said arm 293. Figure 22 shows the relative positions, after the card-picker member 192 has started forward, of the rod 292, the switch-controlling hook 291, the arm 293 of the lever 285, and the auxiliary switch controlled by the hook-shaped member of said rod.

It will be evident from said Figure 22 that, when the carriage-return pinion-shifting lever 285 is reversed to disengage said pinion from its driving member to conclude the carriage-return movement, the hook 291 is ahead of a downwardly-extending tab 355 of the swingable contact-member of the auxiliary switch, and will be raised to a position opposite said tab. In the subsequent rearward endwise movement of the rod 292, which will be effected as the card-picker member completes its rearward movement, the swingable switch-member will be withdrawn to effect separation of the contacts 289 and 290, as the hook 291 encounters said tab 355 in said endwise rearward movement.

The beginning and the end of the reciprocatory movement are also used to control the carriage-holding arm 340. To this end said arm 340 is connected to the card-picker member 192 by means of a link 357, the rear end of which passes freely through a hole in a lug 358 of the card-picker member and is provided with adjustable nuts 359 whereby the effective length of said link may be adjusted to facilitate the timing of the withdrawal of said arm 340. As the card-picker member begins its forward movement, the end of said arm 340 moves into the path of the card-carriage stud 329 under the influence of a spring 360, which may be applied to move said arm, as best shown in Figure 23. The arm 340 is thus enabled to snap into carriage-holding position as the stud 329 passes the end of said arm at the conclusion of the return movement of the card-carriage (see Figure 24). As the card-picker member 192 reaches the end of its rearward movement, the arm 340, which, in co-operation with the card-carriage stud 329 has held said carriage in card-receiving position, will be withdrawn. As said arm is withdrawn from the stud 329, the carriage jumps ahead until the leading stop 205 thereon encounters the stepping dog 215 of the card-carriage escapement-mechanism. Said leading stop 205 is so positioned that the first zone of the card to be punched is then in register with the punches, as indicated in Figure 14.

The escapement-dog-carrying member will meanwhile have been caused to be restored to normal through the displacement of the cam-shaped arm 245 and its attached train of parts. Said displacement is, as already explained, also effected during the forward movement of the card-picker member 192.

By the movement of the card-carriage as it escapes from the arm 340, the retractible card-holding finger 258 is restored to its card-holding position, as shown in Figure 14, by means of a dog 380 having an incline 381 which engages a pin 382 projecting from the side of said finger 258. As said pin is engaged by said incline it is displaced upwardly and rises to the top of the incline, thereby restoring the card-holding finger 258, from which it projects, to its normal position in which said finger is held by the detent-spring 261. The dog 380 is spring-pressed and swingably pivoted at 383 (Figure 9) so that the pin 382 may pass in the return movement of the card-carriage, said pin idly turning said dog aside as it passes.

Before a card may begin its advance from the supply-stack, it is necessary to withdraw the previously-mentioned retractible pins 249, which serve to retain and guide a card as it is moved towards the punches by the card-carriage. The means whereby the pins are thus retracted are best shown in Figures 6, 12, 22 and 23. In order that the pins may be retracted, they are mounted at the ends of swingable arms 361 spaced apart as shown in Figure 23. The other ends of said arms are pivoted in slotted lugs 362 depending from the under surface of the card-perforator body-member 162. Connecting said arms at points intermediate their ends is a bail-rod 363 having its ends securely joined to said arms and carrying at its center a roll 364. By means of said bail-rod 363 both arms may be pulled downwardly simultaneously to retract the pins 249 at the ends thereof. The arms are drawn upwardly by springs 365, so that the pins 249 are normally elevated and in card-guiding position, as shown in Figure 12. The bail-rod 363 joining said arms is so disposed that the roll 364 thereon is encountered by the end of the card-picker member retaining and guide rod 196. Immediately after said card-picker member begins its forward movement, said roll and consequently the pin-carrying arms are displaced by the forward portion of said rod 196, and the withdrawal of the pins is thereby effected before an advancing card reaches said pins. When the card-picker member completes its rearward movement, the forward end portion of the rod 196 recedes from the roll 364, thereby permitting the pins to be elevated again, under the influence of the springs 365, to their normal card-guiding positions. Cross-pins 366, projecting from said retractible pins, react against the under surface of the perforator body-member 162 and thereby limit the extent to which said pins are elevated by the pull of said springs 365.

Figure 15 shows an illustrative work-sheet divided into item-defining zones, the work-sheet being shown in position around the platen of the typewriter. An illustrative card is also shown, and, like the work-sheet, is divided into item-defining zones. Figure 15 also shows how the denominational tabulating stops 102 and 102ª are arranged for the illustrative work-sheet. Three sets of the register-bar-controlling jacks 61 are shown, each set of jacks serving to advance the register-bars of a corresponding register into pin-setting position in denominational order in the manner explained. One of the jacks of each set is what may be called a space-jack and, by the usual means not shown, serves to lock the pin-setting mechanism while the carriage is traversing the usual space that sets off the usual cent-columns from the usual dollar-columns in amount zones. It will be understood that the space-jack may be omitted if desired. The middle set of jacks serves the register-bars to which the punch-selecting slides 147 are connected. The five punch-selecting slides 147 which are herein shown are connected to register-bars controlled by the first five jacks,—not counting the space-jack,— from the left of the middle set of jacks, said first five jacks including the two cent-jacks and three dollar-jacks. Classification items on the work-sheet, such as Requisition No., Kind, File No., etc., have no distinguishing space separating the last two columns from the preceding columns as have the items which indicate the amount. The tabulating counter-stops 102 for these classification-items are therefore so set that, when the typewriter-carriage is tabulated to units-position for said classification-items, said stops encounter the stop indicated by the number 81ª in Figure 15. The computing machine cycle-initiating tappet 103 associated with each of said stops 102 is therefore offset to the left of each stop 102 as seen in Figure 15, so that said tappet 103 may override the pawl 222 of the automatic cycle-initiating lever 104 as soon as the typewriter-carriage escapes after the last units-figure of a classification-item has been written. Where a tabulating stop is set for an amount-column, however, the stop is so set that the unit-cent-position of the carriage would be obtained by elevating the tabulating stop at the extreme left of the field of stops 81 and since, when an amount-item is written, a cycle is not to be initiated until the carriage escapes after writing the unit-cent, the tappet for initiating said cycle is in line with the regular tabulating stop as indicated by the tappet and stop, marked 103ª and 102ª, of Figure 15. It will be understood that, instead of employing the automatic cycle-initiating means, a computing-machine cycle may also be initiated by pressing the usual manually-operable cycle-initiating key 98, Figure 1, every time after an item, which is to be accumulated or punched, is typewritten.

For each kind of item that is to be recorded in the card there is provided a selector-dog 68, each of said selector-dogs co-operating with the middle set of jacks because said each dog has a tappet 71 so disposed in respect to the previously-mentioned offset end portions of the several sets of jacks 61 that said tappet 71 will, when engaged, actuate the middle set of jacks. It will be readily understood that these last-mentioned selector-dogs, which may be called the perforator-dogs, are set in the usual relation to their corresponding denominational tabulating counter-stops 102. That is to say, the dogs are so set that if the carriage has been tabulated, as for example to the "tens" position, the corresponding selector-dog engages the "tens" jack. The amount-items, besides being recorded in cards, are also accumulated in one or more of the registers of the Underwood-Hanson machine. One of the registers is illustratively allotted for this purpose and is the register designated as register 3, Figure 15. Register 3 is controlled by the set of jacks at the right of said Figure 15. Two selector-dogs are therefore employed during the writing of said amount on the work-sheet of the typewriter. One of these two dogs, marked 68ª in Figure 15, engages the middle set of jacks for effecting the required selection of punches, while the other dog, marked 68ᵇ in Figure 15, engages the right-hand set of jacks, both dogs 68ª and 68ᵇ engaging their respective sets of jacks simultaneously. For illustrating how other registers may be employed, it may also be assumed that quantity items are also accumulated in a register and the register allotted for this purpose may be register 1, Figure 15. For quantity items two selector-dogs are also employed. One of these dogs, designated as 68ᶜ, engages the left-hand set of jacks, while the other of said dogs, designated as 68ᵈ, engages the middle set of jacks.

If there is an item-zone on the work-sheet as, for example, the zone in which the file number is written and for which there is no corresponding zone on the card, there may be provided what may be called an idle stop 205 on the card-carriage 199. Said idle stop serves to catch and hold the card-carriage 199 when tabulating the typewriter-carriage for the file number, and thereby avoids subsequent skipping of the next zone on the card when the typewriter-carriage is again tabulated. In so catching and holding the card-carriage said carriage will escape and move at least one column-space, the extent to which the carriage so moves depending on where the idle stop is set. By employing the idle stop the advance of said next zone may be restricted to said one space, said next zone being in Figure 15 the dept. zone.

If there are two or more successive zones on the work-sheet for which there are no corresponding zones on the card, an idle stop is employed for each zone. It will be understood, however, that the number of idle stops which may be successively employed depends on the width of the zone that is to be punched next on the card because, as stated, the card-carriage necessarily moves one space as each idle stop is engaged by the operation of a typewriter tabulating key. There will be no punches operated for the file number because there is no corresponding selector-dog 68 for said file number. In the illustrative work-sheet herein shown, the file number zone is, as just explained, followed by the dept.

zone, for which there is a corresponding zone on the card, and a regular stop 205 set for said dept. zone would be engaged by the card-perforator carriage-escapement mechanism when the typewriter-carriage is positioned to the desired column for the dept. zone. The card also shows illustratively a unit zone for which there is no corresponding zone on the work-sheet of the typewriter. Said unit zone has only one column immediately following the part number zone, and may be served by the same selector-dog that serves said part number zone. A digit type-key is depressed for recording in said unit zone of the card whatever digit may be required. To avoid printing said digit on the work-sheet of the typewriter, said work-sheet having no unit zone, the usual Underwood non-print device shown in the patent to R. M. Becker, No. 1,104,468, dated July 21, 1914, may be employed. As shown in Figure 1, said non-print device includes a swingable arm 369 pivoted upon the type-bar segment 370 and is swingable by means of the usual linkage including a non-print key, not shown, into such position that a padded end of said arm 369 obstructs the final part of the movement of the type-bar toward the platen and thereby prevents the type on said bar from printing.

Means are provided for disconnecting the perforating mechanism from the Underwood-Hanson combined typewriting and computing machine so that said machine can be used independently of said perforating mechanism. As shown in Figures 1 and 7, there may be accordingly provided at the right side of the computing mechanism a manually-operable slide 371, the endwise movement of which serves to displace a bail 372 underlying the links 153 that serve to connect the punch-selecting slides 147 with their corresponding register-bars. The forward end portions of said links are guided in a slotted plate 313 fastened to the rear side of the computing-machine casing through which said end portions of the links project toward the end of the register-bars. Said links are joined to said register-bars by the type of connection indicated in Figures 1, 4 and 16, the connections being so devised that the small endwise movement of the register-bars necessary to bring said bars into pin-setting position has no effect upon the punch-selecting slides 147. Said connections are also devised so that the ends of the links 153 may be displaced upwardly to disconnect said links from the register-bars, and it is for thus swinging the links 153 upwardly that the bail 372 is provided. Said bail, at the middle of the machine, may be connected to an operating arm 376 at the side of the machine by a rock-shaft 375. Said arm 376 is engaged by the aforementioned manually-controlled slide 371. The rearward end portion of said slide has a cam-and-dwell formation, as indicated in Figure 1, and a pin 377 in said operating arm 376 reacts upon said dwell when the manually-operable slide and the bail 372 are in normal positions as shown in Figure 1. A spring 378 urges said bail upwardly and causes the reaction of the pin 377 upon said dwell. As the dwell is withdrawn from said pin by moving the manually-operable slide endwise in a forward direction, the bail 372 under the influence of said spring 378 rises upwardly and lifts the ends of the links 153 from the ends of the register-bars. It is also desired in disconnecting the card-perforating mechanism from the rest of the machine to silence the several power-shafts of said card-perforating mechanism. There is therefore provided the aforementioned clutch 266 which serves to connect or disconnect the pulley 263 with or from the primary shaft 262 of the perforating mechanism. As shown in Figure 1, said clutch may include a driven member that is slidable endwise upon said primary shaft 262 and has teeth that may interlock with similar teeth of said pulley 263. The endwise movable clutch-member may be moved by the manually-operable slide 371 to which it is connected in the manner indicated in Figure 1. To this end a downwardly and rearwardly extending projection 379 of said slide engages a groove of said endwise movable clutch-member. A further downward extension 379a of said slide 371 serves to control a switch 380a so that, when said manually-operable slide is moved forwardly to disconnect the perforating mechanism, the auxiliary switch of the perforating mechanism is rendered ineffective to afford a by-pass circuit for operating the motor 96. The reason for thus rendering the auxiliary switch inoperative is that it may be caused to be closed by pressing the typewriter-carriage-return key after the clutch 266 has been operated to silence the power-driven means including the carriage-returning means of the card-perforating mechanism. In this case the card-carriage would not be returned, and consequently the auxiliary switch-contacts would not be opened, the motor 96 keeping on running after the first time the typewriter-carriage-return key is pressed after the card-perforator-mechanism has become disconnected. The manner in which the switch 380a is connected and whereby it is capable of rendering the perforator auxiliary switch inoperative is shown in the circuit diagram of Figure 8. Said Figure 8 also indicates how the auxiliary switch and its controlling hook 291 may be insulated from the rod 292 and from the attachments at the other end of said bar. The source of current for the motor is conventionally indicated at 381a.

As shown in Figure 9, the punch-operating plungers 148, mounted on the punch-selecting slides 147, are not aligned with any of the punches when said slides are in their normal positions, but are somewhat behind the first row of digit-punches. A computing-mechanism register-bar, in which no pin is set, will have no movement imparted to it during a computing-mechanism accumulating cycle. The punch-selecting slide 147 will therefore have no movement if its corresponding register-bar has no pin indexed in it, and will remain in its normal position, as shown in Figure 9, in which its plunger 148 cannot operate one of the punches 145.

As also shown in Figure 9, each lever 151, which serves to connect a punch-selecting slide 147 with a corresponding register-bar, may have applied thereto a spring 390 which serves to restore said slide to its normal position. In the normal positions of the slides 147 heels 398 of said slides stop against the rear slide-guiding plate and thereby determine said normal positions. The lower end of each lever 151 may be slotted to embrace a groove in its fulcrum-rod 152 so as to be easily assembled upon said fulcrum-rod and easily detachable therefrom. A spring 391 for each lever 151 may be applied, as shown in Figure 9, to hold the slotted end of said lever in its groove. The fulcrum-rod 152 may be retained in forwardly directed extensions 392 of the perforator body-member. A spring 393, applied as shown in Figure 9, serves to restore the train of punch-depressing mechanism to its normal position after said mechanism has been operated to punch.

The perforating mechanism, being compact, may be conveniently supported by the stand that regularly supports the combined typewriting and computing mechanism, as shown in Figure 5. To this end, the perforator body-member 162 may have, at each end, forwardly directed extensions 394 which may be secured to the upper ends of the two rear upright legs 395 of said stand. From said extensions 394 there may be downward extensions 396 which may bear against the sides of said legs and thereby serve to act as bracing supports for the perforator-mechanism.

A description of the manner in which the entire mechanism operates will now be given. To illustrate said description, the work-sheet 400 and the card 401 of Figure 15 may be referred to. For each line of items on the work-sheet a card is to be punched. It will be noticed that the card shows zones for punching the day and the month. The punching of said zones or similar zones which may be uniform for a large number of cards may, if desired, be done in a separate punching device wherein the punches may be set up and the setting maintained while the required number of cards is quickly run through and punched by said separate punching device. With the typewriter-carriage in its initial line-beginning position and the card-carriage positioned as shown in Figure 14, and holding the card 401 which is blank, the typewriter-carriage is tabulated to the requisition zone, thereby causing the card-carriage to also position the requisition zone of the card under the first three columns from the left in the nest of punches. The required number is then written in the requisition zone of the typewriter work-sheet, and, after writing the last numeral, the computing mechanism is automatically caused to be cycled and the requisition number is thereby punched in the card. A tabulating key is then pressed to bring the required denominational column of the kind zone of the work-sheet to the printing point. As the tabulating key for the kind zone is tabulated the kind zone of the card is positioned. It may be stated at this point that, for classification zones, the card-carriage is always positioned so that the units-column of one of said classification zones always registers with the third punch-column from the left in the nest of punches. The classification zones of the work-sheet may, as indicated in Figure 15, have more denominational columns than the corresponding zones of the card. After the last and only number designating the kind is written, the computing mechanism is again automatically caused to cycle to record the kind number in the card. Next in order on the work-sheet is the zone for the file number, and the required tabulating key is operated to position the typewriter-carriage to the denominational column for the first numeral to be written. As there is no corresponding file number zone on the card, an idle stop 205 is set to hold the card-carriage when the tabulating key of the file number zone is pressed. The file number is thereupon written. The computing mechanism will not be cycled after the last numeral of the file number is written, because there is no corresponding zone on the card, and to avoid initiating a computing-machine cycle the tabulating stop 102$^b$ is employed, said tabulating stop 102$^b$ lacking a tappet 103 whereby the lever 104 could be actuated to initiate a computing-machine cycle. The zone on the work-sheet next in order is the department zone. Upon pressing a tabulating key for said department zone, the card-carriage is caused to be released from its idle stop 205, and the department zone of the card is caused to register with the nest of punches in such manner that the units-column of said card department zone registers with the third punch-column from the left of the nest of punches. In a similar manner the account zone and part No. zone of the work-sheet are positioned by pressing the required tabulating key for each zone; the numbers are written for the account and part No. zones, and, as the last digit of each number is written, the computing mechanism is automatically cycled and the account and part No. zones of the card are respectively punched.

It has been stated that the same selector-dog 68 which served for the part No. zone may also serve for the unit zone because said unit zone has only one column. Neither, in such case, is a tabulating counter-stop 102 employed on the typewriter-carriage for the unit zone. The unit zone would be punched by one of the punches in the fourth column from the left in the nest of punches. In order to bring the typewriter-carriage into position to engage the second jack from the left of the middle set of jacks and which second jack controls said fourth column of punches, the usual space-key, not shown, of the typewriter may be operated. After operating the required digit-key to select the required punch for the unit zone, the usual cycle-initiating key 98 is pressed to initiate a computing machine cycle, thereby causing the unit zone to be punched according to the digit-key operated. As there is no corresponding unit zone on the work-sheet, the type-key is silenced in respect to printing by employing the previously-mentioned non-print device of the patent to Becker.

A selector-dog 68 and counter-stop 102 for tabulating may be advantageously employed, however, even for card-zones having only one column, and such counter-stop and selector-dog are illustratively indicated for the unit zone in Figure 15. In this case the required tabulating key is to be pressed and a stop 205 is set for bringing the unit zone into register with the third column of punches from the left. The employment of a counter-stop 102 for single-column zones like the unit zone obviates the necessity of manipulating the space-key and the cycle-initiating key 98 in the manner just mentioned.

The next card-carriage stop 205 to be engaged by the card-carriage tabulating mechanism is so set that the space on the card reserved for the description, as shown in Figure 15, is jumped when the next tabulating key is operated for positioning the typewriter-carriage for the quantity zone, and said next stop 205 may be so set that the unit-column of the quantity zone registers with the third column from the left of the nest of punches. As previously stated, two selector-dogs, namely, 68$^c$ and 68$^d$, are set for the quantity when it is desired to accumulate also said quantity in a register. As the last numeral of the quantity zone is written, the computing mechanism will automatically be cycled, thereby causing the quantity to be accumulated in register 1 and the card to be punched. An idle tabulating counter-stop 102$^b$ is employed and set after the counter-stop for the quantity zone and preceding the counter-stop for the amount zone. The reason for employing the idle counter-stop 102$^b$ is as follows: As the unit-jack for the quantity zone is the fourth jack from the left of the two sets of jacks employed for said quantity zone, it follows that the counter-stop for the quantity zone will not be clear of the field of denominational stops 81, and, if it be desired to tabulate the typewriter-carriage for a cents position in the amount zone, the cents denominational stop 81, elevated ahead of the counter-stop for the quantity zone, would preclude proper positioning of the typewriter-carriage. The idle counter-stop 102$^b$ therefore serves to arrest the typewriter-carriage as it is moved to advance the quantity zone counter-stop just beyond the field of denominational stops 81, the tabulating key of lowest denominational order being employed for this purpose, so that the idle counter-stop 102$^b$ is also advanced beyond the field of denominational stops 81 after it has served to arrest the typewriter-carriage. A tabulating key is now pressed for positioning the typewriter-carriage for the amount zone, the stop 102$^a$ serving to so position the carriage, and a stop 205 being so set on the card-carriage that the unit cents-column of the card-zone is caused to register with the last column of punches from the left. Two sets of selector-dogs, namely, 68$^a$ and 68$^b$, are employed, as previously stated, for the amount zone, the dog 68$^b$ co-operating with the set of jacks at the right of Figure 15 and thereby serving to effect accumulation of the amount item in register 3. The accumulation and punching of said amount are automatically effected through the medium of the tappet 103$^a$ which co-operates with pawl 222 as the typewriter-carriage escapes after the last digit of the amount-item has been written.

The typewriter-carriage-return key is now pressed to initiate a return movement of the typewriter carriage, said return movement being automatically concluded as the typewriter-carriage reaches its line-beginning position. Concomitantly with the pressing of the carriage-return key 127, the card-carriage is fully released from its escapement-mechanism and consequently, under the influence of its spring motor, advances toward the card-ejecting feed-rolls 224 and 225 to present the punched card thereto. As the card-carriage reaches the end of its card-delivering advance, the latch 287 is caused to be tripped, causing the carriage-returning pinion 280 to engage its driving member 284, which is already under rotation due to the rotation of the motor 96 which was initiated as soon as the carriage-return key 127 was depressed. By tripping the latch 287, the auxiliary switch of the card-perforating mechanism is also closed to keep the motor running, if necessary, irrespective of whether or not the switch of the typewriter-carriage-return mechanism is opened to stop the motor when the typewriter-carriage concludes its return movement. The card-carriage, now under way on its return movement, encounters at a predetermined point in said movement the extension 324, whereby the catch 314 is withdrawn from the card-feeding clutch. A card from the bottom of the supply-stack 186 is thereby caused to begin its advance towards the feed-rolls 190 and 191, and, after being presented to said feed-rolls by the advance movement of the card-picker member 192, which ensues upon the release of the card-feeding clutch, continues to advance by means of said feed-rolls. Owing to the advance of the card-picker member 192, the arm 340 has been caused to be pressed into the path of the card-carriage stud 329. As the carriage-returning pinion 280 is disengaged from its driving member at the conclusion of the return movement of the carriage, the card-carriage settles against the arm 340 long enough and in such position as to receive the card being advanced by the feed-rolls 190 and 191. After the card-carriage has thus received the card, the reciprocatory card-picker member will conclude its return movement, and the conclusion of said return movement serves to withdraw the arm 340, so that the card-carriage advances to the position indicated in Figure 14 or to any other position desired and determined by the position of the leading card-carriage stop 205. The card-feed clutch-controlling catch 314 will meanwhile have reassumed its normal position to check further rotation of the card-feed crank 294 after the card-picker member 192 has fully returned to its normal position. The auxiliary switch of the perforator-mechanism will also be opened as the card-picker member reaches the end of its return movement, and the motor 96 will be stopped, providing the switch of the typewriter-carriage-return mechanism has also been operated to stop said motor, that is to say, if the typewriter-carriage has already been fully returned. If the typewriter-carriage is not yet fully returned, the motor will keep on running until the typewriter-carriage-return-mechanism switch is caused to be opened by concluding the typewriter-carriage return.

By employing a nest of punches arranged as herein shown and which punches are controlled by a denominational series of register-bars, denominational tabulating may be effected in card-zones without employing denominational tabulating means in the card-perforator mechanism. For example, if, in the amount zone, it be desired to punch say only in the cents-columns, the cents-columns of punches are directly and automatically selected through the co-operation of the typewriter denominational tabulating mechanism and the means including the selector-jacks 61, said means serving to advance the proper denominational register-bars to pin-setting position. Hence the proper columns of punches are selected for the cents-columns without having recourse either to stepping the card-carriage along to render the cents-columns active, or else to employing a separate denominational tabulating mechanism for the perforator. Furthermore, should the typewriter-carriage be tabulated to the wrong position, the required correction may be made by shifting the typewriter-carriage to the correct position without considering the card-carriage. For example, if the typewriter-carriage should be tabulated too far ahead, it may be pulled back by means of the usual back-space key, not shown. The card-carriage would not need to be back-spaced, as it automatically arrives in correct position with respect to the nest of punches, irrespective of whether or not the proper tabulating key was pressed.

It will be noticed that a work-sheet much wider than the card may be used, that is to say, the work-sheet may have more zones than the card, and each zone of the work-sheet may itself have more columns than the corresponding zone of the card. While the typewriter is being operated to write in the zones for which there are no corresponding zones of the card, the card-perforator is held virtually inoperative by the simple expedient of omitting, for the typewriter-zones, the selector-dogs 68 that engage the middle set of jacks 61, and by employing the idle perforator-stops 205 to hold the card-carriage in the manner hereinbefore explained. If the typewriter-carriage is not to be tabulated in the zones for which there are no corresponding zones on the card, the idle stops 205 may also be omitted.

Variations may be resorted to within the scope of the invention, and portions of the improvements may be used without others.

Having thus described my invention, I claim:

1. In a punching machine, the combination of a single set of keys for the digits 1 to 9 operable independently of one another, a group of digital-punching devices arranged in denominational order, means, including a denomination-selector, under the control of said keys for setting up said digital-punching devices seriatim in successive denominations for a card item-field having a plurality of denominations, a driving motor, a cycling mechanism driven by said motor, means controlled by said cycling mechanism for causing the punching of a field of the card under the control of the set-up punching devices, means for effecting relative field-travel between the card and the punches in the direction in which said denominations succeed one another, including a field-jumping carriage, and means for predetermining the fields to which the carriage will jump, carriage-returning means normally inoperative, means callable into action following the punching of said card in any field, for enabling said motor to return said field-jumping carriage, and means automatically becoming effective to limit the return stroke of said carriage, and cause it to settle at an initial field.

2. The combination with a system of ten digit-type keys and a set of reciprocatory digital members all movable to different extents to index different digits, each digital member under the control of any of said keys, of a stationary nest of digit-punches arranged in a plurality of denominational columns in a punching zone, each column including a series of digit-punches, means controlled by said digital members whereby any digit-punch is automatically selected and rendered effective at the reciprocatory movement of said digital members, means for causing the selected punches to punch, and manipulable means whereby a record-card may be caused to travel laterally relatively to said punching zone to bring successive fields (each of one or more denominations) thereof seriatim to the punching zone.

3. The combination with a system of ten digit-type keys and a set of reciprocatory digital members all movable to different extents to index different digits, each digital member under the control of any of said keys, of a stationary nest of digit-punches arranged in a plurality of denominational columns in a punching zone, each column including a series of digit-punches, means controlled by said digital members whereby any digit-punch is automatically selected and rendered effective at the reciprocatory movement of said digital members, means for causing the selected punches to punch, a carriage whereby a record-card may be shifted laterally relatively to the nest of punches, and a tabulating mechanism operative to successively position said card-carriage to bring successive item-fields (each of one or more denominations) of said card seriatim to the punching zone, said tabulating mechanism including card-carriage-positioning stops defining the item-fields of said card.

4. The combination with digit-keys and a set of reciprocatory denominational members movable to extents controlled by said keys, of a nest of digit-punches arranged in a plurality of denominational columns, means connected to and controlled by said reciprocatory members whereby digit-punches corresponding to the keys operated are automatically selected and rendered effective during the reciprocatory movement of said members, said movement ensuing upon the operation of said keys, means effective during said movement for causing the effective punches to punch, a movable carriage whereby a record-card may be brought into register with the nest of punches, an escapement-mechanism controlling the movements of said carriage so that item-defining zones of said card may successively register with said nest of punches, said escapement-mechanism including settable stops whereby the extent of zone-registering movements of said carriage may be predetermined, and power-driven means for returning said carriage to a normal initial position.

5. A card-perforating mechanism having, in combination, a nest of digit-punches arranged in a plurality of denominational columns, a die-plate co-operating therewith and normally separated from the ends of the punches by a gap, punch-selecting means, means for effecting co-operation of said die-plate and the selected punches to punch, a carriage for moving a card through said gap from an initial position in which said carriage receives a card, means for holding a supply of cards, means for feeding one card at a time from said supply and conveying it to the position in which it is received by said carriage, key-controlled means for positioning said carriage to successively bring predetermined item-defining zones of the card into register with said punches, card-ejecting feed-rolls disposed so that said carriage may deliver a card thereto, key-controlled means for causing said carriage to advance and deliver said card to said feed-rolls, and power-driven means, automatically becoming effective upon the delivery of said card to said feed-rolls, whereby said feed-rolls are rotated and said carriage is returned to its card-receiving position, and whereby also a new card is caused to be fed to said carriage from the supply of cards.

6. A perforating mechanism for punching items in cards which have a line of item-defining fields, each field having a predetermined number of denominational columns of digit-spaces in which holes may be punched, said mechanism including a nest of digit-punches arranged in denominational columns, each of which includes a plurality of punches, the number of punch-columns being consonant with the maximum number of digit-space columns which may occur in an item-field of the cards, carriage-means for shifting the card laterally for bringing the several fields of the card seriatim into denominational register with the nest of punches, a system of ten digit-keys, means, co-operative with each digit-key, for selecting punches of different denominations seriatim for an item, and means for causing all the selected punches for said item to punch simultaneously.

7. A perforating mechanism for punching items in cards which have a line of item-fields, each field having a predetermined number of denominational columns of digit-spaces in which holes may be punched, said mechanism including a nest of digit-punches arranged for denominational columns, each of which includes a plurality of punches, the number of punch-columns being consonant with the maximum number of digit-space columns which may occur in an item-field of the cards, means for moving a card from a supply-position and positioning the first or leading field of said card in denominational register with the nest of punches, a system of ten digit-keys, means, co-operative with each digit-key, for selecting the punches of different denominations seriatim for an item, means for causing all the selected punches for said item to punch simultaneously, and key-controlled carriage-means for shifting the card laterally for bringing the several item-fields succeeding said first or leading field of said card seriatim into denominational register with the nest of punches, said last-mentioned means being operated as each item-field is punched.

8. A perforating mechanism for punching items in cards which have a line of item-defining fields, each field having a predetermined number of denominational columns of digit-spaces in which holes may be punched, said mechanism including a nest of digit-punches arranged in denominational columns, each of which includes a plurality of punches, the number of punch-columns being consonant with the maximum number of digit-space columns which may occur in a field of the cards, means, including a card-carriage, arranged to receive a card and position the first or leading field thereof in denominational register with the nest of punches, a system of ten digit-keys, means, co-operative with each digit-key, for selecting the punches of different denominations seriatim for an item, means for causing all the selected punches for said item to punch simultaneously, and key-controlled means for advancing said card-carriage in predetermined steps, thereby to shift the card laterally to bring the several item-fields, succeeding said first or leading item-field, seriatim into denominational register with the nest of punches, said card-carriage being thus advanced as each item-field of the card is punched.

9. A perforating mechanism for punching items in cards which have a line of item-fields, each field having a predetermined number of denominational columns of digit-spaces in which holes may be punched, said mechanism including a nest of digit-punches arranged in denominational columns, each of which includes a plurality of punches, the number of punch-columns being consonant with the maximum number of digit-space columns which may occur in an item-field of the cards to be punched, means, including a card-carriage, arranged to receive a card and position the first or leading item-field thereof in denominational register with the nest of punches, a system of ten digit-keys, means co-operative with each digit-key, for selecting the punches of different denominations seriatim for an item, means for causing all the selected punches for said item to punch simultaneously, key-controlled means for advancing said carriage in predetermined steps coextensive with the item-fields, thereby to shift the card laterally to bring the several item-fields, succeeding said first or leading item-field, seriatim into denominational register with the nest of punches, said carriage being thus advanced as each field is punched, card-ejecting means disposed so that said carriage may advance and deliver a card thereto when the last field has been punched, and means for causing said carriage to advance and deliver said card to said card-ejecting means preparatory to the return of said carriage.

10. A perforating mechanism for punching items in cards which have item-defining zones, each zone having a predetermined number of denominational columns of digit-spaces in which holes may be punched, said mechanism including a nest of digit-punches arranged in denominational columns, the number of punch-columns sufficing for the maximum number of digit-space columns which may occur in a zone of the cards to be punched, means, including a movable card-carriage, arranged to receive a card and bring the first or leading zone thereof into denominational register with the nest of punches, key-controlled means operable for selecting the punches for an item, the punch-selecting means also enabling the selected punches for said item to punch simultaneously, means for causing the selected punches to punch, key-controlled means for advancing said carriage in predetermined steps, thereby to successively bring the several zones succeeding said first or leading zone into denominational register with the nest of punches, said carriage being thus advanced as each zone is punched, card-ejecting means disposed so that said carriage may deliver a card thereto when the last zone has been punched, and key-controlled means for causing said carriage to advance and deliver said card to said card-ejecting means.

11. A perforating mechanism for punching items in cards which have item-defining zones, each zone having a predetermined number of denominational columns of digit-spaces in which holes may be punched, said mechanism including a nest of digit-punches arranged in denominational columns, the number of punch-columns sufficing for the maximum number of digit-space columns which may occur in a zone of the cards to be punched, a card-carriage movable from an initial card-receiving position, card-feeding means operable to advance a card to said carriage, key-controlled means for advancing said carriage to successively bring item-defining zones of the card into register with said punches, key-controlled means, operable whenever a zone registers with said punches, for selecting the punches for an item of said zone, the punch-selecting means also enabling all the selected punches for said item to punch simultaneously, means for causing the selected punches to punch, card-ejecting means operable to remove the card from said carriage, power-driven means for returning said carriage to said initial position, said carriage-returning means automatically becoming effective as the card-ejecting means are engaged, and means whereby the return movement of the card-carriage at a predetermined point initiates operation of the card-feeding means, thereby to cause a card to be delivered to said carriage as said carriage settles in its initial position at the conclusion of its return movement, said card-feeding means advancing a card transversely of the direction of carriage-movement.

12. A card-perforator having punches, a card-carriage movable to carry a card into register with said punches, said carriage having a card-receiving slit, card-feeding means arranged to advance a card edgewise towards said slit, retractable pins for a guiding said card at the edge opposite said slit, said pins stationary in respect to the card as it moves into register with the punches and disposed in the path of the card-feeding advance of a card, and means automatically becoming effective in the engagement of the card-feeding means, whereby said pins are retracted to permit the advance of the card, and whereby said pins are also caused to be restored after said slit has received the card.

13. A card-perforator having punches, a card-carriage movable to carry a card into register with said punches, said carriage having a card-receiving slit, card-feeding means including feed-rolls arranged to advance the card edgewise towards said slit, the axes of said rolls disposed parallel to the punch-registering movement of the card, said feed-rolls also disposed along the path of said movement and normally separated to permits said movement, and means automatically becoming effective upon the engagement of the card-feeding means whereby said feed-rolls are brought together to effect the card-feeding advance of the card, and whereby said feed-rolls are also caused to be separated again after said slit has received a card.

14. A card-perferator having punches, a carriage movable to advance a card under said punches, said carriage having a card-gage to locate the card therewith, a card-magazine to hold a supply of cards, card-feeding means to deliver a card from the magazine to said carriage, including means to initiate a card-feeding operation from said magazine to the carriage, and automatic means responsive to the operation of said initiating means to deliver said card to the gage of the carriage.

15. A card-perforator having punches, a carriage movable to advance a card under said punches, said carriage having a card-gage to locate the card therewith, a card-magazine, card-feeding means to deliver a card from the magazine to said carriage, including means to initiate a card-feeding operation from said magazine, and automatic means including card-feeding rollers normally out of engagement with said card but made effective by the operation of said initiating means to deliver said card to the gage of the carriage.

16. A card-perforator having punches, a card-carriage movable to advance a card into register with said punches, said carriage having a card-gage, a card-magazine, card-feeding means arranged to move the card from the magazine towards said gage, retractible members in the path of the card between the magazine and the gage for guiding said card at the edge opposite said gage during the card-advancing movement, and automatic means effective, in response to the card-moving means, to restore said members after the card has been inserted in the gage.

17. A card-perforator including a plurality of rows of punches, punch-selecting devices, means to effect a punching operation by the selected devices, a carriage to feed a card through the machine to be perforated, a magazine for holding a supply of cards, means for feeding one card at a time from said magazine to said carriage, key-controlled means to feed the card zone by zone under said punches, card-ejecting means effective to receive the card from said carriage after the last zone has been perforated, key-controlled means to advance said carriage and deliver said card to the ejecting means, and means automatically effective upon delivery of the card to said ejecting means, to eject the card and return said carriage to its initial card-receiving position.

18. A card-perforator for punching cards having a number of item-fields succeeding one another laterally of a card, each field having a predetermined number of columns of spaces in which holes may be punched, said perforator including a plurality of denominational rows of digit-punches, the number of rows of punches being consonant with the maximum number of denominations which may occur in any one field of the card, said number of rows of punches being therefore less than the entire number of card-denominations which composes all of said fields, carriage-means for shifting the card laterally for feeding successively the several fields of the card into perforating positions with reference to the punches, a set of ten digit-keys, means-co-operative with each digit-key, for selecting the punches in different denominations, to perforate in any one item-field, and punch-operating means effective to cause all the selected punches to simultaneously perforate an item-field.

19. A card-perforator for punching in a card having a number of item-fields succeeding one another laterally of the card, each item-field having a predetermined number of columns of spaces in which holes may be punched, said perforator including a gang of punches arranged in denominational rows, each including a plurality of digit-punches, the number of denominational rows of punches corresponding to the maximum number of columns which may occur in any one item-field of the card, a card-magazine, means for removing a card from said magazine and bringing the first item-field thereof to the gang of punches, a set of ten digit-keys and co-operative denomination-feeding means, means serving under control of said keys and denomination-feeding means to index the punches column by column for each item-field, means effective to operate all of the indexed punches to punch simultaneously for each item-field, and a card-carriage feedable in steps coextensive with the item-fields, to bring the several item-fields, succeeding said first item-field, seriatim to the gang of punches, said carriage being arranged for controlling said card upon its removal from said magazine.

20. A card-perforator for punching in a card having a number of item-fields, succeeding one another laterally of the card, each field having a predetermined number of columns of spaces in which holes may be punched, said perforator including a gang of punches arranged in denominational rows, each including a plurality of punches, the number of denominational rows of punches corresponding to the maximum number of columns which may occur in any one item-field of the card to be punched, a system of ten digit-keys and a co-operative letter-feeding carriage, means serving under control of said digit-type keys and carriage to index the punches column by column for each zone, means effective to operate all of the indexed punches to punch simultaneously for each item-field, and a card-carriage, having feeding means independent of the letter-feeding carriage, for advancing said card in steps coextensive with the item-fields, to bring said item-fields seriatim to said gang of punches.

21. A card-perforator for perforating a card having a number of item-fields succeeding one another laterally of the card, said perforator having a gang of digit-punches consonant in number of denominations with an item-field, means, including a system of ten digit-keys and co-operative denomination-feeding means, for selecting the punches desired to punch separately each item-field of a card, a carriage effective to feed the card to the gang of punches an item-field at a time, means to actuate all of the selected punches simultaneously at each item-field to perforate the card, a card-ejecting device arranged relatively to said carriage so that, after the last item-field in the card has been advanced by the carriage and perforated, the carriage, by a further advance, in the same direction, delivers the card to said card-ejecting device preparatory to the return of the carriage.

22. A keyboard-controlled card-perforator for perforating cards having a number of zones therein, a plurality of punches, means for selecting the punches desired to punch separately each zone of a card, a carriage effective to feed the card through the perforator a zone at a time, means to actuate all of the selected punches at each zone to perforate the card, a card-ejecting device to remove the card from the machine, and means, responsive to a key after the last zone in the card has been perforated, to advance the carriage and deliver the card to said device.

23. A card-perforator for punching item-fields succeeding one another laterally of a card, each field having a predetermined number of columns of spaces in which holes may be punched, said perforator including a gang of punches arranged in denominational rows, each including a plurality of punches, the number of denominational rows of punches being consonant with the maximum number of columns which may occur in any one item-field of the card, means including a card-carriage, arranged to receive the card and position the first item-field thereof for punching by the gang of punches, means, including and controlled by a set of ten digit-keys and co-operative denomination-feeding means, for indexing the punches denomination by denomination for an item-field, punch-operating means effective to cause all the indexed punches to perforate simultaneously for an item-field, means for advancing said carriage after each field of the card is perforated to bring successively the several item-fields succeeding said first perforated field into punching position with reference to the punches, an automatic card-ejector toward which the card-carriage is directed by its advance between field-punching operations, and means operable at will for causing said card-carriage to uninterruptedly advance and deliver the card to said card-ejector to be automatically removed from the machine following the punching of any field.

24. In a typing and card-punching machine, the combination of a system of digit-type keys and letter-feeding means, a gang of denominational columns of digit-punches, denominational punch-selectors, each movable along a corresponding punch-column, denominational actuators for moving said punch-selectors, means, associated with said digit-type keys and letter-feeding means, to set up numerical values in said actuators, a general operator serving to move said actuators to punch-selecting extents corresponding to said values, punch-operating means coacting with said general operator for causing the selected punches to punch, a series of shiftable couplers for connecting said actuators to corresponding punch-selectors for their joint general-operator-driven movement, and means for shifting said couplers into and out of effective position depending on desired uses of the digit-type keys and letter-feeding means with or without punching.

25. In a typing and card-punching machine the combination of a system of digit-type keys and letter-feeding means, a gang of denominational columns of digit-punches, denominational punch-selectors, each movable along a corresponding punch-column, denominational actuators for moving said punch-selectors, means, associated with said digit-type keys and letter-feeding means, to set up numerical values in said actuators, a general operator serving to move said actuators to punch-selecting extents corresponding to said values, punch-operating means coacting with said general operator for causing the selected punches to punch, a series of shiftable couplers for connecting said actuators to corresponding punch-selectors for their joint general-operator-driven movement, means for shifting said couplers into and out of effective position depending on desired uses of the digit-type keys and letter-feeding means with or without punching, means for feeding cards to the punches, and means controlled by said coupler-shifting means for rendering said card-feeding means operative or inoperative consonantly with said uses of the digit-type keys with or without punching.

26. A card-punching machine having a stationary field of punches and companion dies, a table extending laterally from said dies, a step-by-step feeding carriage for advancing a card laterally over said table to bring different item-fields of the card under said punches, said carriage including a card-edge-receiving gage that parallels and skirts one side of the card-advancing path and stationary field of punches, said carriage also including a card-pushing spur to engage said card at the corner formed by a side edge of the card and the card-edge received in said gage, and stationary guide-means, associated with said table, for the edge of the card opposite the carriage-gage-received edge.

27. In a card-perforating machine having a bank of punches, a table supporting the same, over which a card may be advanced to the punches and then advanced to a card-depositing point, a spring-propelled carriage running along one edge of said table, effective to advance the card, an escapement-device for controlling the movement of the carriage so as to bring different zones on the card under the punches, said escapement-device being adjustable for different widths of zones, and key-controlled means for releasing the escapement-device to permit the carriage to advance through a single zone, said escapement device being responsive to another key after all the zones have been perforated, effective to advance the same to card-ejecting position.

28. A card-perforating machine having a stationary field of punches, a table, associated with said punches, over which a card may be advanced step by step to bring successive item-fields thereof to the field of punches and then further advanced in the same direction to a card-depositing point, a spring-propelled carriage running along one edge of said table, effective to so advance the card, an escapement-device for controlling the movement of the carriage so as to bring different item-fields on the card under the punches, said escapement-device being adjustable for different denominational widths of the item-fields, key-controlled means for controlling the escapement-device to permit the carriage to advance the card one item-field at a time, and other key-controlled means controlling the escapement-device to effect a direct, that is, non-stop, advance of the card-carriage to the card-depositing point from any item-field position of said card-carriage.

29. In a card-punching machine having a set of punches, a table including means for advancing a card over said table to bring different zones of the card over said punches, said card-advancing means including a movable carriage bearing against the transverse edge of said table, said carriage including a gage to receive the card and a projection at one end thereof effective to advance the card over the table, displaceable guide-members spaced from said gage substantially at a distance the width of the card to act as a guide therefor, a card-magazine, means for advancing a card therefrom to said gage, said displaceable guide-members being located in the path of said card-advancing movement, and means for displacing said members out of said path prior to advancing a card.

30. A card-perforator for punching cards having a succession of item-fields, each of one or more denominations, therein, a gang of punches, arranged, consonantly with the maximum number of denominations in any item-field, in a number of denominational columns, each of which includes a plurality of digit-punches, means, including and controlled by a system of ten digit-keys and co-operative denomination-feeding means, for indexing the punches, denomination by denomination for an item-field, means for causing all the indexed punches for an item-field to punch simultaneously, a carriage effective to feed a card one item-field at a time to the gang of punches to be perforated, settable members on said card-carriage, located thereon according to the denominational widths of the item-fields, and key-controlled escapement-mechanism coacting with said members to control the feed of said carriage through different distances according to the denominational widths of the item-fields.

31. A card-perforator for punching items of data as perforations in cards having a number of item-defining zones therein, a set of punches, a carriage effective to feed a card zone by zone to the punches to be perforated, settable members on said carriage, located thereon according to the widths of the zones, and key-controlled escapement-mechanism coacting with said members to control the feed of said carriage through different distances according to the widths of the respective zones, said escapement-mechanism including a pair of dogs normally engaging said settable members to feed the card through the various zones, and means to move both of said dogs out of the path of the members during the return movement of the card-carriage.

32. A card-perforator for punching items of data as perforations in cards having a number of item-defining zones therein, a set of punches, a card-ejecting device, a carriage to feed a card zone by zone to the punches to be perforated, releasable feed-controlling means for said carriage, a key-controlled device effective to release the carriage from the controlling means to cause the punched card to be fed to said ejecting device, means to return the carriage to its initial position, means to feed a new card to the carriage, and means to be operated by the carriage during its return movement to initiate said feed of the new card to the carriage.

33. A card-perforator for punching items of data as perforations in cards having a number of item-defining zones therein, a set of punches, a card-ejecting device, a carriage to feed a card zone by zone to the punches to be perforated, releasable feed-controlling means for said carriage, a key-controlled device effective to release the carriage from the controlling means to cause the punched card to be fed to said ejecting device, power-driven means automatically operated to return the carriage when the latter has delivered the punched card to the ejecting device, and means tripped by the returning carriage to start a new card to be fed into the machine.

34. A card-perforator for punching items of data as perforations in cards having a number of item-defining zones therein, a set of punches, a card-ejecting device, a carriage to feed a card zone by zone to the punches to be perforated, releasable feed-controlling means for said carriage, a key-controlled device effective to release the carriage from the controlling means to cause the punched card to be fed to said ejecting device, power-driven means automatically operated to return the carriage when the latter has delivered the punched card to the ejecting device, means tripped by the returning carriage to start a new card to be fed into the machine, means to retain the carriage in its returned position to receive the new card, and means to automatically release the carriage therefrom after having received the card and cause the carriage to respond to said feed-controlling means.

35. Combined indexing and card perforating mechanisms, the perforating mechanism being in the nature of an attachment to the indexing mechanism and having denominational columns of punches, the punches in each column having a certain unit-spacing, the perforating mechanism also having denominational punch-selecting slides movable along said punch-columns to select the punch in each column to be operated; the indexing mechanism including a set of denominational indexing devices and means including and controlled by a system of ten digit-keys and cooperative denomination-feeding means for controlling movements of said indexing devices through different numbers of unit-spaces differing from the unit-spacing of the punches; and means connecting said indexing devices and punch-selecting slides in tandem for concomitant punch-selecting movements, said connecting means including a plurality of arms extending from a fulcrum-axis, one arm for each slide, and link-rods connected at one end with said indexing devices, and connected at their other ends to points on the arms a certain distance from said fulcrum-axis, said slides being connected to said same arms at a different distance from said fulcrum-axis, said distances being proportioned so that the indexing devices, moving through a given number of unit-spaces, cause the punch-selecting slides to move the same number of punch-spaces.

36. In a card-perforating machine having a table, a carriage, a card-magazine to hold on said table a supply of cards to be perforated, means for advancing a single card at a time from said magazine to the carriage, said means including a movable member having an edge protruding less than the thickness of the card above the surface of said table effective to push the bottom card from the magazine, a magazine front including a bar mounted on the table, and spaced therefrom a distance slightly more than the thickness of a single card, forming a path thereunder for the single card to pass, a movable member normally operative to close said path, and automatic means responsive to the movement of said carriage effective to remove the movable member from said path to make effective the advancing operation of said card to the carriage.

37. In a card-perforating machine having a table, a carriage, a card-magazine to hold on said table a supply of cards to be perforated, means for advancing a single card at a time from said magazine to the carriage, said means including a movable member having an edge protruding less than the thickness of the card above the surface of said table effective to push the bottom card from the magazine, a magazine front including a bar mounted on the table, and spaced therefrom a distance slightly more than the thickness of a single card, forming a path thereunder for the single card to pass, a movable member normally operative to close said path, and automatic means responsive to the movement of said carriage effective to remove the movable member from said path to make effective the advancing operation of said card to the carriage, said movable member including means to gage the rear of the new card after the same has been advanced to said carriage.

38. The combination of a set of digit-keys, a carriage having letter-spacing movements under the control of said keys, a denomination-selector controlled by said carriage, an indexing mechanism including a set of denominational elements selectable seriatim by said selector as the carriage travels, said indexing mechanism also including digit-indexing devices controlled by said keys, including a plurality of sets of digit-pins, one set for each denominational element, whereby the appropriate pin of the set controlled by the selected denominational element is settable by any of said digit-keys, a gang of punches disposed in denominational columns and corresponding with said digit-pins of the indexing mechanism, a set of punch-operators, one for each denomination, a general operator to advance said punch-operators selectively by co-operation with the individual key-set pins for said punch-operators, whereby the punch-operators are variously presented to the punches, and means for automatically causing the punch-operators to operate the selected punches to perforate a card according to the operation of the keys and the travel of the carriage.

39. In a card-punching machine having punches and a framework having a table-surface including punch-dies over which a card is advanced in a straight path to bring different parts of the card under the punches, and is then further advanced in the same direction along the same path to deposit said card, means for so advancing said card, said means including an endwise movable rod having a card-edge receiving face skirting said path, a card-pushing spur projecting from said face, a card-retaining piece forming another spur, said spurs spaced lengthwise of said rod to receive therebetween a card, the card-retaining piece being formed and mounted for moving transversely of said rod for withdrawing its spur to permit deposit of a card, and spring-pressed detenting means for yieldably holding said card-retaining piece in either its effective position or its withdrawn position.

40. In a card-punching machine having punches and a framework having a table-surface including punch-dies over which a card is advanced in a straight path to bring different parts of the card under the punches, and is then advanced along the same path to deposit said card, means for so advancing said card, said means including an endwise movable rod having a card-edge receiving face, a card-pushing spur projecting from said face, a card-retaining piece forming another spur, said spurs spaced lengthwise of said rod to receive therebetween a card, the card-retaining piece being formed and mounted for moving transversely of said rod for withdrawing its spur to permit deposit of a card, means automatically effective in the card-depositing advance of the carriage to withdraw said card-retaining piece, means for returning said carriage and feeding a new card thereto, and means automatically effective to restore the card-retaining piece as the carriage receives a new card.

41. In a punching machine, the combination with a set of ten numeral-keys, a letter-feeding carriage controlled thereby, indexing devices including a set of denominational elements selected by said carriage and also including a set of digit-pins selectable by any of the keys, and a general operator for said denominational elements, of a bank of punches, punch-selectors controlled by said denominational elements, and means to operate the selected punches.

42. In a punching machine, the combination with a set of ten numeral-keys, a letter-feeding carriage controlled thereby, indexing devices including a set of denominational elements selected by said carriage and also including a set of digit-pins selectable by any of the keys, and a general operator for said denominational elements, of a bank of punches, punch-selectors controlled by said denominational elements, means to operate the selected punches, a second carriage, and means co-operating with said second carriage and said bank of punches to effect a relative column shift between the punches and a work-card.

43. In a punching machine, the combination with a set of ten numeral-keys, a letter-feeding carriage controlled thereby, indexing devices including a set of denominational elements selected by said carriage and also including a set of digit-pins selectable by any of the keys, and a general operator for said denominational elements, of a bank of punches, punch-selectors controlled by said denominational elements, means to operate the selected punches, a second carriage, and means co-operating with said second carriage and said bank of punches to effect a relative column shift between the punches and a work-card, independently of the movement of the first-mentioned carriage.

44. In a punching machine, the combination with a set of ten numeral keys, a carriage controlled thereby, indexing devices including a set of denominational elements selected by the carriage and also including a set of digit-pins selectable by any of the keys, means to move the denominational elements in extents of movement controlled by the digit-pins, a bank of punches, punch-selectors controlled by the denominational elements, means cooperating with the carriage to suppress selection of certain denominational elements and means to operate the selected punches.

45. In a punching machine, a plurality of columns of pins adapted to differentially position a plurality of punch selectors, one for each column, a single set of keys, and means whereby said keys are adapted by their successive operations to successively select a pin in each column, said selectors provided with visible amount-indicating means.

46. In a punching machine, a plurality of punch selectors, means for determining the position of said selectors comprising a plurality of rows of pins each of which is adapted to be latched in operative position, a single set of keys, means whereby said keys are adapted by their successive operation to select a pin in each column, and dials connected to said selectors.

47. In a card punching machine, in combination, a card punch structure; operating means therefor, card removing means including continually running rollers adapted to remove the card in a direction at right angles to the direction of its entry and means controlled by said operating means for permitting effective operation of said rollers after said punch structure has been operated.

48. In a punching machine, the combination with a plurality of punch selecting members, means for moving the punch selecting members into operative position, means for controlling the individual movement of the punch selecting members which comprise a plurality of columns of plungers, a single column of keys, means for locking one of the plungers in each column in set position, and means controlled by said keys for setting a plunger in each column upon successive operations of said keys.

49. In a punching machine, a plurality of denominational columns of punches, a plurality of denominations of punch-selectors, devices, including denomination-feeding means for differentially and selectively setting said punch-selectors in denominational succession, and means readily operable to render any of said punch-selectors unresponsive to said selector-setting devices in order to render the latter operative relatively to only a portion of the denominations.

50. In a punching machine, a plurality of punch selectors, means for determining the position of said selectors comprising a plurality of rows of pins each of which is adapted to be latched in operative position, a single set of keys, means whereby said keys are adapted by their successive operation to select a pin in each column, and movable means to render any of said selectors unresponsive.

51. In a punching machine, the combination with a movable punch selecting member, means for moving the same, a visible dial permanently pinion-geared to said selecting member, and means for independently determining the movement of said punch selecting member which comprises in part a plurality of pins and means for locking one of the pins in set position.

52. In a punching machine, the combination with a plurality of movable punch selecting members, means for moving the same, visible dials permanently pinion-geared to said selecting members, and means for independently determining the movement of each punch selecting member which comprises in part a plurality of pins, means for locking said selecting member in moved position, and means for returning the pins to normal.

53. In a punching machine, the combination with a plurality of punch selecting members, means for moving the punch selecting members into operative position, means for controlling the individual movement of the punch selecting members which comprise a plurality of columns of plungers, a single column of keys, means for locking one of the plungers in each column in set position, means controlled by said keys for setting a plunger in each column upon successive operations of said keys, and dials geared to said selecting members.

54. A punching machine, a plurality of columns of punches, a plurality of columns of punch-selecting pins, movable devices, including a single set of nine digit-keys, for differentially and selectively setting said punch-selecting pins in succession, and movable means to render any of said punch-selecting pins unresponsive to said pin-setting devices.

55. In a punching machine, a plurality of punch selectors, means for determining the position of said selectors comprising a plurality of rows of pins each of which is adapted to be latched in operative position, a single set of nine digit-keys, means whereby said keys are adapted by their successive operation to select a pin in each column, and movable means to render any of said selectors unresponsive.

56. A punching machine including a single set of digit-keys, a denominational carriage controlled thereby, a plurality of columns of punches, punch-operating means, an actuating selector for each column, means whereby the keys and carriage co-operate to index said actuating selectors successively preparatory to differential adjustment thereof to position for the punching operation, means operable, after the successive indexing of the actuating selectors, to effect the differential adjustment of said actuating selectors preparatory to operation of said punch-operating means, and a dial permanently pinion-geared to each selector.

57. A punching machine, a plurality of columns of punches, a plurality of columns of punch-selecting pins, movable devices, including a single set of nine digit-keys, for differentially and selectively setting said punch-selecting pins in succession, digit-indicating means co-operative with said keys, and movable means to render any of said punch-selecting pins unresponsive to said pin-setting devices.

58. In a punching machine, a plurality of punch selectors, means for determining the position of said selectors comprising a plurality of rows of pins each of which is adapted to be latched in operative position, a single set of nine digit-keys, means whereby said keys are adapted by their successive operation to select a pin in each column, dials connected to said selectors, and movable means to render any of said selectors unresponsive.

59. In a punching machine, the combination of a single set of keys for the digits 1 to 9 operable independently of one another, a group of digital-punching devices arranged in denominational order, means, including a denomination-selector, under the control of said keys for setting up said digital-punching devices seriatim in successive denominations for a card item-field having a plurality of denominations, a driving motor, a cycling mechanism driven by said motor, means controlled by said cycling mechanism for causing the punching of a field of the card under the control of the set-up punching devices, means for effecting relative field-travel between the card and the punches in the direction in which said denominations succeed one another, including a field-jumping carriage, means for predetermining the fields to which the carriage will jump, carriage-returning means normally inoperative, and means callable into action following the punching of said card in any field, for enabling said motor to return said field-jumping carriage to initial position.

60. In a punching machine, the combination of a single set of keys for the digits 1 to 9 operable independently of one another, a group of digital-punching devices arranged in denominational order, means, including a denomination-selector, under the control of said keys for setting up said digital-punching devices seriatim in successive denominations for a card item-field having a plurality of denominations, a driving motor, a cycling mechanism driven by said motor, means controlled by said cycling mechanism for causing the punching of a field of the card under the control of the set-up punching devices, means for effecting relative field-travel between the card and the punches in the direction in which said denominations succeed one another, including a field-jumping carriage, and means for predetermining the fields to which the carriage will jump.

61. In a card-punching machine having a set of keys for the digits 1 to 9 operable independently of one another, a denomination-feeding carriage co-operative with said keys, digital-punching devices arranged successively in a group equivalent to the plurality of denominations of an item-defining field of a card that has a line of substantially such field succeeding one another in the same direction as the denominations succeed one another, means under the control of said keys and denomination-feeding carriage for setting up said digital-punching devices seriatim in successive denominations, a driving motor, a cycling mechanism driven by said motor, means controlled by said cycling mechanism for punching a card under the control of the set-up digital-punching devices, means for effecting relative field-travel between the card and group of digital-punching devices including a field-jumping carriage movable in said direction, and means for predetermining the field to which the carriage will jump.

62. A card-punching machine having, in combination, a single set of digit-keys, denomination-feeding means controlled by said keys, a set of reciprocatory denominational devices movable to different digit-extents, indexing mechanism controlled by said keys and denomination-feeding means for predetermining said extents seriatim for said denominational devices preparatory to reciprocating the latter, a cycling mechanism whereby said devices are reciprocated to said extents following the operation of said keys, a nest of digit-punches arranged in a punching zone in a plurality of denominational columns that correspond to the number of denominations in an item-field of the card, means connected to and controlled by said reciprocatory devices whereby digit-punches corresponding to the keys operated are automatically selected and rendered effective consonantly with the reciprocatory movement of said devices, means coacting with said cycling mechanism for causing the effective punches to punch, and means whereby a record-card having item-fields may be caused to register successive fields seriatim with said nest of punches, said fields succeeding one another in the same direction as said denominations succeed one another, thereby to effect perforation of said card in accordance with the keys operated, while each field is registered relatively to said nest of punches, said keys being operated, said reciprocatory devices being moved, and the effective punches being caused to punch in a process individual for every card-field to be punched.

63. In a punching machine, the combination of a one-field complement of denominational punching devices for punching successively a plurality of fields, each of one or more denominations, distributed laterally over a work-piece, a single set of digit-indexing keys, a denomination-feeding main carriage coacting with any digit-indexing key, means whereby, at each of successive indexing zones in the range of carriage-travel, each zone of one or more denominations, said single set of digit-indexing keys and carriage co-operate to index said punching devices, means operable at each indexing zone to actuate the indexed punching devices to punch and then restore the punching devices to normal positions, a secondary carriage, for said work-piece, and means whereby said secondary carriage is automatically shifted consonantly with the traverse by the main carriage of different indexing zones, to thereby successively register said work-piece fields with said punching devices.

64. In a punching machine, the combination of a one-field complement of denominational punching devices for punching successively a plurality of fields, each of one or more denominations, distributed laterally over a work-piece, a single set of digit-indexing keys, a denomination-feeding main carriage coacting with any digit-indexing key, means whereby, at each of successive indexing zones in the range of carriage-travel, each zone of one or more denominations, said single set of digit-indexing keys and carriage co-operate to index said punching devices, means operable at each indexing zone to actuate the indexed punching devices to punch and then restore the punching devices to normal positions, and means serving to shift the work-piece laterally consonantly with the indexing zones of the denomination-feeding main carriage, to thereby successively register said work-piece fields with said punching devices.

65. In a combined typewriting and punching machine, the combination of typewriting mechanism, including keys and a letter-feeding typing carriage coacting with any key, for typing on a separate work-piece, a group of devices for punching a succession of fields, each of one or more denominations, distributed laterally over a card, means to enable said keys and typing carriage to index said punching devices, digitally and denominationally, means controlled by the indexing mechanism to actuate the punching devices to punch a field of said card and then restore the punching devices to normal positions, a secondary carriage for the card which is to be punched, and means for advancing said secondary carriage one or more denominations at a time to successively register the fields of the card with said group of punching devices.

66. In a combined typewriting and punching machine, the combination of typewriting mechanism, including typing keys and a letter-feeding carriage, for typing a line on a record-sheet, a card-punching mechanism having a limited denominational capacity corresponding to the number of denominations of an item-zone in the line of typing, and means enabling the typing keys and carriage to control an item-punching operation of said card-punching mechanism for said zone, said means including a zone-staging device controlled by said carriage and also including provision for differentially adjusting said zone-staging device to enable any selected part along and of said line of typing, within the punching-mechanism capacity, to constitute said punching zone.

67. In a combined typewriting and punching machine, the combination of typewriting mechanism, including typing keys and a letter-feeding carriage, for typing a line on a record-sheet, a card-punching mechanism having a limited denominational capacity corresponding to the number of denominations of an item-zone in the line of typing, and means enabling the typing keys and carriage to control an item-punching operation of said card-punching mechanism for each of a succession of zones in said line of typing, each zone of one or more denominations up to the capacity of said punching mechanism, said means including a plurality of zone-staging devices controlled by said carriage.

68. A combined typewriting and perforating machine having, in combination, a set of ten digit-type keys, a letter-feeding typewriter-carriage coacting with said digit-type keys, a tabulator-key for said typewriter-carriage, a group of card-punching devices operable under the control of said keys and carriage, a card-carriage independent of the typewriter-carriage, and feeding means, including a power-drive, individual to said card-carriage, controlled by said tabulator-key for tabulating the card-carriage to bring a succession of item-fields of the card into register with said card-punching devices concomitantly with the tabulations of said typewriter-carriage for typing different items.

69. The combination of a typewriter-mechanism for typing on a record-sheet, said typewriter-mechanism having for this purpose a set of digit-keys, a set of digit-types operable thereby, and a carriage having letter-feeding mechanism under the control of said digit-keys; a primary indexing mechanism including denomination-controlling devices operated by said carriage and also including digit-indexing devices operated by said keys whereby combined denomination-selection and digit-indexing is effected at every stroke of any key; a system of card-punches, for punching a card that is separate from said record-sheet, said punches selectable denominationally and digitally by said primary indexing mechanism, and cycling means, operable after a completion of typing on said record-sheet, for effecting punching of said card according to the aforesaid indexing of the punches.

70. The combination of a typewriter-mechanism for typing on a record-sheet, said typewriter-mechanism having for this purpose a set of digit-keys, a set of digit-types operable thereby, and a carriage having letter-feeding mechanism under the control of said digit-keys; a primary indexing mechanism including denomination-controlling devices operated by said carriage and also including digit-indexing devices operated by said keys whereby combined denomination-selection and digit-indexing is effected at every stroke of any key; a system of card-punches, for punching a card that is separate from said record-sheet, said punches selectable denominationally and digitally by said primary indexing mechanism, and cycling means, operable after a completion of typing on said record-sheet, for effecting punching of said card according to the aforesaid indexing of the punches, said cycling means having means to restore the primary indexing devices of said typewriter-mechanism to normal positions.

71. The invention as set forth in claim 69, inclusive of means for supporting said system of card-punches behind and substantially contiguous to said typewriter-mechanism, the primary indexing mechanism being arranged to stem from said typewriter-mechanism to said system of card-punches.

FRANK K. DAVIS.